United States Patent
Griglak

(10) Patent No.: US 9,690,752 B2
(45) Date of Patent: Jun. 27, 2017

(54) METHOD AND SYSTEM FOR PERFORMING ROBUST REGULAR GRIDDED DATA RESAMPLING

(71) Applicant: Exelis Inc., McLean, VA (US)

(72) Inventor: Brian Joseph Griglak, Longmont, CO (US)

(73) Assignee: Harris Corporation, Melbourne, FL (US)

(*) Notice: Subject to any disclaimer, the term of this patent is extended or adjusted under 35 U.S.C. 154(b) by 212 days.

(21) Appl. No.: 14/505,810

(22) Filed: Oct. 3, 2014

(65) Prior Publication Data

US 2016/0098378 A1   Apr. 7, 2016

(51) Int. Cl.
*G06F 11/07*   (2006.01)
*G06F 17/18*   (2006.01)

(52) U.S. Cl.
CPC .................................. *G06F 17/18* (2013.01)

(58) Field of Classification Search
None
See application file for complete search history.

(56) References Cited

U.S. PATENT DOCUMENTS

| 5,313,567 | A  | * | 5/1994  | Civanlar | G06T 17/00 |
|-----------|----|---|---------|----------|------------|
|           |    |   |         |          | 345/419    |
| 8,031,204 | B1 | * | 10/2011 | Heckbert | G09G 5/28  |
|           |    |   |         |          | 345/467    |
| 2004/0017224 | A1 | * | 1/2004 | Tumer | H03F 3/087 |
|           |    |   |         |          | 327/51     |
| 2007/0160153 | A1 |   | 7/2007 | Sullivan |         |
| 2011/0149268 | A1 |   | 6/2011 | Marchant |         |
| 2016/0098378 | A1 | * | 4/2016 | Griglak | G06T 3/00 |
|           |    |   |         |          | 708/190    |

OTHER PUBLICATIONS

Robert G. Keys—Cubic Convolution Interpolation for Digital Image; Dec. 1981.
International Preliminary Report on Patentability in PCT Appln. No. PCT/US2015/053973, dated Apr. 13, 2017.

* cited by examiner

*Primary Examiner* — David H Malzahn
(74) *Attorney, Agent, or Firm* — Davidson Berquist Jackson & Gowdey LLP

(57) ABSTRACT

During data resampling, bad samples are ignored or replaced with some combination of the good sample values in the neighborhood being processed. The sample replacement can be performed using a number of approaches, including serial and parallel implementations, such as branch-based implementations, matrix-based implementations, and function table-based implementations, and can use a number of modes, such as nearest neighbor, bilinear and cubic convolution.

25 Claims, 18 Drawing Sheets

| bitmask (binary) | bitmask (decimal) | validity | bitmask (binary) | bitmask (decimal) | validity |
|---|---|---|---|---|---|
| 0000 | 0 | F\|F<br>-+-<br>F\|F | 1000 | 8 | T\|F<br>-+-<br>F\|F |
| 0001 | 1 | F\|F<br>-+-<br>F\|T | 1001 | 9 | T\|F<br>-+-<br>F\|T |
| 0010 | 2 | F\|F<br>-+-<br>T\|F | 1010 | 10 | T\|F<br>-+-<br>T\|F |
| 0011 | 3 | F\|F<br>-+-<br>T\|T | 1011 | 11 | T\|F<br>-+-<br>T\|T |
| 0100 | 4 | F\|T<br>-+-<br>F\|F | 1100 | 12 | T\|T<br>-+-<br>F\|F |
| 0101 | 5 | F\|T<br>-+-<br>F\|T | 1101 | 13 | T\|T<br>-+-<br>F\|T |
| 0110 | 6 | F\|T<br>-+-<br>T\|F | 1110 | 14 | T\|T<br>-+-<br>T\|F |
| 0111 | 7 | F\|T<br>-+-<br>T\|T | 1111 | 15 | T\|T<br>-+-<br>T\|T |

Figure 4

| validity bitmask (decimal) | half-quadrant index | | | | | | | |
|---|---|---|---|---|---|---|---|---|
| | 0 | 1 | 2 | 3 | 4 | 5 | 6 | 7 |
| 0 | 0 | 0 | 0 | 0 | 0 | 0 | 0 | 0 |
| 1 | 1 | 1 | 1 | 1 | 1 | 1 | 1 | 1 |
| 2 | 0 | 0 | 0 | 0 | 0 | 0 | 0 | 0 |
| 3 | 0 | 0 | 1 | 1 | 0 | 0 | 1 | 1 |
| 4 | 1 | 1 | 1 | 1 | 1 | 1 | 1 | 1 |
| 5 | 1 | 1 | 1 | 1 | 1 | 1 | 1 | 1 |
| 6 | 0 | 1 | 1 | 1 | 0 | 0 | 0 | 1 |
| 7 | 0 | 1 | 1 | 1 | 0 | 0 | 1 | 1 |
| 8 | 0 | 0 | 0 | 0 | 0 | 0 | 0 | 0 |
| 9 | 0 | 0 | 1 | 0 | 1 | 0 | 1 | 1 |
| 10 | 0 | 0 | 0 | 0 | 0 | 0 | 0 | 0 |
| 11 | 0 | 0 | 1 | 0 | 0 | 0 | 1 | 1 |
| 12 | 0 | 0 | 1 | 1 | 0 | 0 | 1 | 1 |
| 13 | 0 | 0 | 1 | 1 | 1 | 0 | 1 | 1 |
| 14 | 0 | 0 | 1 | 1 | 0 | 0 | 0 | 1 |
| 15 | 0 | 0 | 1 | 1 | 0 | 0 | 1 | 1 |

Figure 5A

| validity bitmask (decimal) | half-quadrant index | | | | | | | |
|---|---|---|---|---|---|---|---|---|
| | 0 | 1 | 2 | 3 | 4 | 5 | 6 | 7 |
| 0 | 0 | 0 | 0 | 0 | 0 | 0 | 0 | 0 |
| 1 | 1 | 1 | 1 | 1 | 1 | 1 | 1 | 1 |
| 2 | 1 | 1 | 1 | 1 | 1 | 1 | 1 | 1 |
| 3 | 1 | 1 | 1 | 1 | 1 | 1 | 1 | 1 |
| 4 | 0 | 0 | 0 | 0 | 0 | 0 | 0 | 0 |
| 5 | 0 | 0 | 0 | 0 | 1 | 1 | 1 | 1 |
| 6 | 1 | 0 | 0 | 0 | 1 | 1 | 1 | 0 |
| 7 | 1 | 0 | 0 | 0 | 1 | 1 | 1 | 1 |
| 8 | 0 | 0 | 0 | 0 | 0 | 0 | 0 | 0 |
| 9 | 0 | 0 | 1 | 0 | 1 | 0 | 1 | 1 |
| 10 | 0 | 0 | 0 | 0 | 1 | 1 | 1 | 1 |
| 11 | 0 | 0 | 1 | 0 | 1 | 1 | 1 | 1 |
| 12 | 0 | 0 | 0 | 0 | 0 | 0 | 0 | 0 |
| 13 | 0 | 0 | 0 | 0 | 1 | 0 | 1 | 1 |
| 14 | 0 | 0 | 0 | 0 | 1 | 1 | 1 | 0 |
| 15 | 0 | 0 | 0 | 0 | 1 | 1 | 1 | 1 |

| validity bitmask (decimal/binary) | quadrant | | | | | | | |
|---|---|---|---|---|---|---|---|---|
| | 0 | | 1 | | 2 | | 3 | |
| | half-quadrant index | | | | | | | |
| | 0 | 1 | 2 | 3 | 4 | 5 | 6 | 7 |
| 0 / 0000 | 00 | 00 | 00 | 00 | 00 | 00 | 00 | 00 |
| 1 / 0001 | 11 | 11 | 11 | 11 | 11 | 11 | 11 | 11 |
| 2 / 0010 | 10 | 10 | 10 | 10 | 10 | 10 | 10 | 10 |
| 3 / 0011 | 10 | 10 | 11 | 11 | 10 | 10 | 11 | 11 |
| 4 / 0100 | 01 | 01 | 01 | 01 | 01 | 01 | 01 | 01 |
| 5 / 0101 | 01 | 01 | 01 | 01 | 11 | 11 | 11 | 11 |
| 6 / 0110 | 10 | 10 | 01 | 01 | 10 | 10 | 10 | 01 |
| 7 / 0111 | 10 | 01 | 01 | 01 | 10 | 10 | 11 | 11 |
| 8 / 1000 | 00 | 00 | 00 | 00 | 00 | 00 | 00 | 00 |
| 9 / 1001 | 00 | 00 | 11 | 00 | 11 | 00 | 11 | 11 |
| 10 / 1010 | 00 | 00 | 00 | 00 | 10 | 10 | 10 | 10 |
| 11 / 1011 | 00 | 00 | 11 | 00 | 10 | 10 | 11 | 11 |
| 12 / 1100 | 00 | 00 | 01 | 01 | 00 | 00 | 01 | 01 |
| 13 / 1101 | 00 | 00 | 01 | 01 | 11 | 00 | 11 | 11 |
| 14 / 1110 | 00 | 00 | 01 | 01 | 10 | 10 | 10 | 01 |
| 15 / 1111 | 00 | 00 | 01 | 01 | 10 | 10 | 11 | 11 |

| bitmask | $V_{i,j}$ | $V_{i+1,j}$ | $V_{i,j+1}$ | $V_{i+1,j+1}$ | Equation |
|---|---|---|---|---|---|
| 0 | 0 | 0 | 0 | 0 | 0 |
| 1 | 0 | 0 | 0 | 1 | $F_{i+1,j+1}$ |
| 2 | 0 | 0 | 1 | 0 | $F_{i,j+1}$ |
| 3 | 0 | 0 | 1 | 1 | $F_{i,j+1} + (F_{i+1,j+1} - F_{i,j+1})*dx$ |
| 4 | 0 | 1 | 0 | 0 | $F_{i+1,j}$ |
| 5 | 0 | 1 | 0 | 1 | $F_{i+1,j} + (F_{i+1,j+1} - F_{i+1,j})*dy$ |
| 6 | 0 | 1 | 1 | 0 | $0.5*(F_{i+1,j} + F_{i,j+1}) + 0.5*(F_{i+1,j} - F_{i,j+1})*dx + 0.5*(F_{i,j+1} - F_{i+1,j})*dy$ |
| 7 | 0 | 1 | 1 | 1 | $(F_{i,j+1} + F_{i+1,j} - F_{i+1,j+1}) + (F_{i+1,j+1} - F_{i,j+1})*dx + (F_{i+1,j+1} - F_{i+1,j})*dy$ |
| 8 | 1 | 0 | 0 | 0 | $F_{i,j}$ |
| 9 | 1 | 0 | 0 | 1 | $F_{i,j} + 0.5*(F_{i+1,j+1} - F_{i,j})*dx + 0.5*(F_{i+1,j+1} - F_{i,j})*dy$ |
| 10 | 1 | 0 | 1 | 0 | $F_{i,j} + (F_{i,j+1} - F_{i,j})*dy$ |
| 11 | 1 | 0 | 1 | 1 | $F_{i,j} + (F_{i+1,j+1} - F_{i,j+1})*dx + (F_{i,j+1} - F_{i,j})*dy$ |
| 12 | 1 | 1 | 0 | 0 | $F_{i,j} + (F_{i+1,j} - F_{i,j})*dx$ |
| 13 | 1 | 1 | 0 | 1 | $F_{i,j} + (F_{i+1,j} - F_{i,j})*dx + (F_{i+1,j+1} - F_{i+1,j})*dy$ |
| 14 | 1 | 1 | 1 | 0 | $F_{i,j} + (F_{i+1,j} - F_{i,j})*dx + (F_{i,j+1} - F_{i,j})*dy$ |
| 15 | 1 | 1 | 1 | 1 | $F_{i,j} + (F_{i+1,j} - F_{i,j})*dx + (F_{i,j+1} - F_{i,j})*dy + (F_{i,j} - F_{i+1,j} - F_{i,j+1} + F_{i+1,j+1})*dx*dy$ |

Figure 7

| bitmask | $F'_{i,j}$ | $F'_{i+1,j}$ | $F'_{i,j+1}$ | $F'_{i+1,j+1}$ |
|---|---|---|---|---|
| 0 | 0 | 0 | 0 | 0 |
| 1 | $F_{i+1,j+1}$ | $F_{i+1,j+1}$ | $F_{i+1,j+1}$ | $F_{i+1,j+1}$ |
| 2 | $F_{i,j+1}$ | $F_{i,j+1}$ | $F_{i,j+1}$ | $F_{i,j+1}$ |
| 3 | $F_{i,j+1}$ | $F_{i+1,j+1}$ | $F_{i,j+1}$ | $F_{i+1,j+1}$ |
| 4 | $F_{i+1,j}$ | $F_{i+1,j}$ | $F_{i+1,j}$ | $F_{i+1,j}$ |
| 5 | $F_{i+1,j}$ | $F_{i+1,j}$ | $F_{i+1,j+1}$ | $F_{i+1,j+1}$ |
| 6 | $(F_{i+1,j} + F_{i,j+1})*0.5$ | $F_{i+1,j}$ | $F_{i,j+1}$ | $(F_{i+1,j} + F_{i,j+1})*0.5$ |
| 7 | $F_{i+1,j} + F_{i,j+1} - F_{i+1,j+1}$ | $F_{i+1,j}$ | $F_{i,j+1}$ | $F_{i+1,j+1}$ |
| 8 | $F_{i,j}$ | $F_{i,j}$ | $F_{i,j}$ | $F_{i,j}$ |
| 9 | $F_{i,j}$ | $(F_{i,j} + F_{i+1,j+1})*0.5$ | $(F_{i,j} + F_{i+1,j+1})*0.5$ | $F_{i+1,j+1}$ |
| 10 | $F_{i,j}$ | $F_{i,j}$ | $F_{i,j+1}$ | $F_{i,j+1}$ |
| 11 | $F_{i,j}$ | $F_{i,j} - F_{i,j+1} + F_{i+1,j+1}$ | $F_{i,j+1}$ | $F_{i+1,j+1}$ |
| 12 | $F_{i,j}$ | $F_{i+1,j}$ | $F_{i,j}$ | $F_{i+1,j}$ |
| 13 | $F_{i,j}$ | $F_{i+1,j}$ | $F_{i,j} - F_{i+1,j} + F_{i+1,j+1}$ | $F_{i+1,j+1}$ |
| 14 | $F_{i,j}$ | $F_{i+1,j}$ | $F_{i,j+1}$ | $F_{i+1,j} + F_{i,j+1} - F_{i,j}$ |
| 15 | $F_{i,j}$ | $F_{i+1,j}$ | $F_{i,j+1}$ | $F_{i+1,j+1}$ |

Figure 8

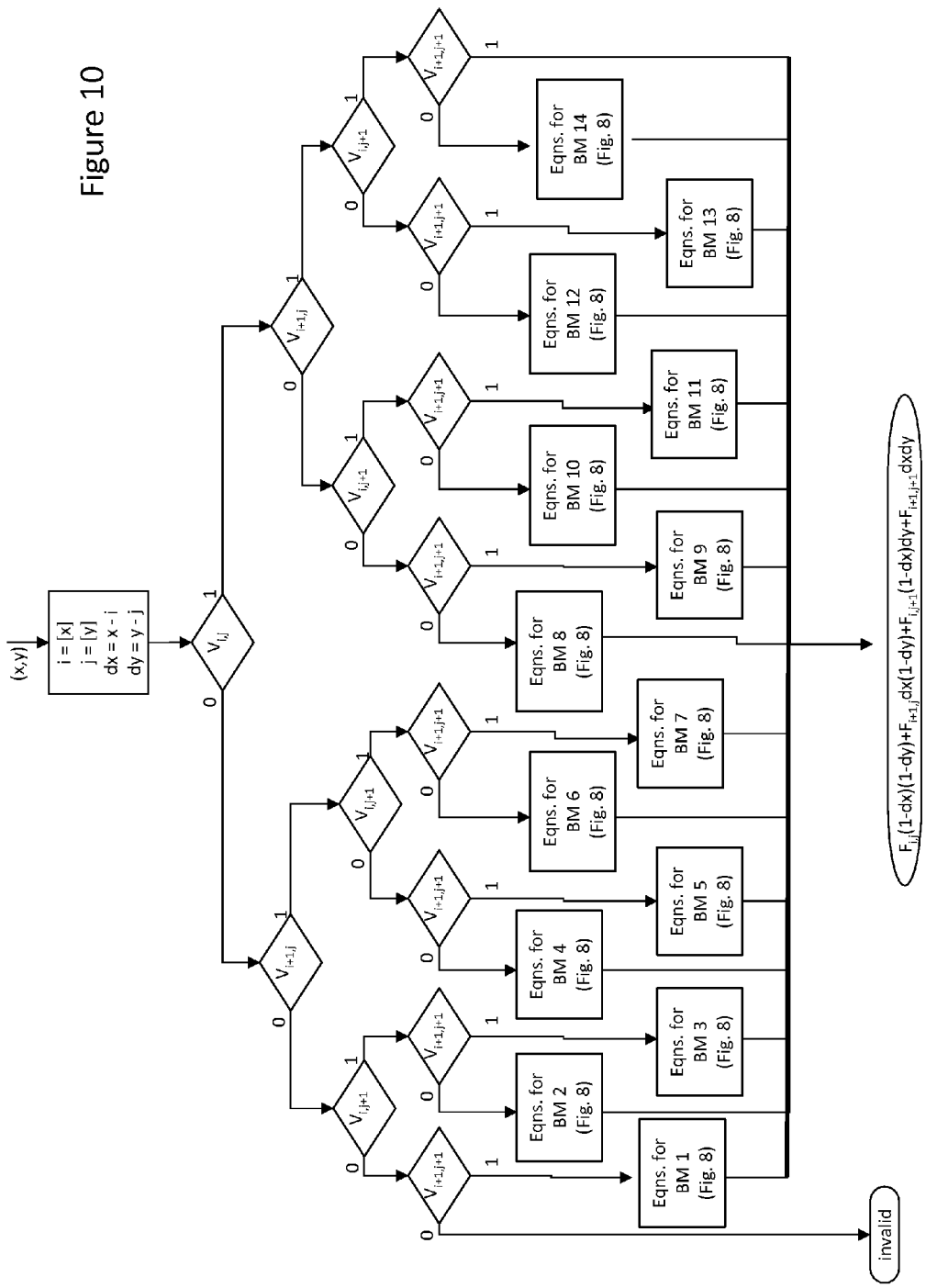

| case | matrix | case | matrix |
|---|---|---|---|
| 0 | $\begin{bmatrix} 0 & 0 & 0 & 0 \\ 0 & 0 & 0 & 0 \\ 0 & 0 & 0 & 0 \\ 0 & 0 & 0 & 0 \end{bmatrix}$ | 8 | $\begin{bmatrix} 1 & 0 & 0 & 0 \\ 1 & 0 & 0 & 0 \\ 1 & 0 & 0 & 0 \\ 1 & 0 & 0 & 0 \end{bmatrix}$ |
| 1 | $\begin{bmatrix} 0 & 0 & 0 & 1 \\ 0 & 0 & 0 & 1 \\ 0 & 0 & 0 & 1 \\ 0 & 0 & 0 & 1 \end{bmatrix}$ | 9 | $\begin{bmatrix} 1 & 0 & 0 & 0 \\ 0.5 & 0 & 0 & 0.5 \\ 0.5 & 0 & 0 & 0.5 \\ 0 & 0 & 0 & 1 \end{bmatrix}$ |
| 2 | $\begin{bmatrix} 0 & 0 & 1 & 0 \\ 0 & 0 & 1 & 0 \\ 0 & 0 & 1 & 0 \\ 0 & 0 & 1 & 0 \end{bmatrix}$ | 10 | $\begin{bmatrix} 1 & 0 & 0 & 0 \\ 1 & 0 & 0 & 0 \\ 0 & 0 & 1 & 0 \\ 0 & 0 & 1 & 0 \end{bmatrix}$ |
| 3 | $\begin{bmatrix} 0 & 0 & 1 & 0 \\ 0 & 0 & 0 & 1 \\ 0 & 0 & 1 & 0 \\ 0 & 0 & 0 & 1 \end{bmatrix}$ | 11 | $\begin{bmatrix} 1 & 0 & 0 & 0 \\ 1 & 0 & -1 & 1 \\ 0 & 0 & 1 & 0 \\ 0 & 0 & 0 & 1 \end{bmatrix}$ |
| 4 | $\begin{bmatrix} 0 & 1 & 0 & 0 \\ 0 & 1 & 0 & 0 \\ 0 & 1 & 0 & 0 \\ 0 & 1 & 0 & 0 \end{bmatrix}$ | 12 | $\begin{bmatrix} 1 & 0 & 0 & 0 \\ 0 & 1 & 0 & 0 \\ 1 & 0 & 0 & 0 \\ 0 & 1 & 0 & 0 \end{bmatrix}$ |
| 5 | $\begin{bmatrix} 0 & 1 & 0 & 0 \\ 0 & 1 & 0 & 0 \\ 0 & 0 & 0 & 1 \\ 0 & 0 & 0 & 1 \end{bmatrix}$ | 13 | $\begin{bmatrix} 1 & 0 & 0 & 0 \\ 0 & 1 & 0 & 0 \\ 1 & -1 & 0 & 1 \\ 0 & 0 & 0 & 1 \end{bmatrix}$ |
| 6 | $\begin{bmatrix} 0 & 0.5 & 0.5 & 0 \\ 0 & 1 & 0 & 0 \\ 0 & 0 & 1 & 0 \\ 0 & 0.5 & 0.5 & 0 \end{bmatrix}$ | 14 | $\begin{bmatrix} 1 & 0 & 0 & 0 \\ 0 & 1 & 0 & 0 \\ 0 & 0 & 1 & 0 \\ -1 & 1 & 1 & 0 \end{bmatrix}$ |
| 7 | $\begin{bmatrix} 0 & 1 & 1 & -1 \\ 0 & 1 & 0 & 0 \\ 0 & 0 & 1 & 0 \\ 0 & 0 & 0 & 1 \end{bmatrix}$ | 15 | $\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

Figure 11

| $V_{i-1,j-1}$ | $V_{i+2,j-1}$ | $V_{i-1,j+2}$ | $V_{i+2,j+2}$ | bitmask | category | matrix |
|---|---|---|---|---|---|---|
| 0 | 0 | 0 | 0 | 0 | G | $\begin{bmatrix} 0 & 1 & -0.5 & 0 & 1 & 0 & 0 & 0 & -0.5 & 0 & 0 & 0 & 0 & 0 & 0 & 0 \\ 0 & -0.5 & 1 & 0 & 0 & 0 & 0 & 1 & 0 & 0 & 0 & -0.5 & 0 & 0 & 0 & 0 \\ 0 & 0 & 0 & 0 & -0.5 & 0 & 0 & 0 & 1 & 0 & 0 & 0 & 0 & 1 & -0.5 & 0 \\ 0 & 0 & 0 & 0 & 0 & 0 & 0 & -0.5 & 0 & 0 & 0 & 1 & 0 & -0.5 & 1 & 0 \end{bmatrix}$ |
| 0 | 0 | 0 | 1 | 1 | B | $\begin{bmatrix} 0 & 0 & 0 & 0 & 0 & 9 & -9 & 3 & 0 & -9 & 9 & -3 & 0 & 3 & -3 & 1 \\ 0 & 0 & 0 & 0 & 0 & 0 & 0 & 3 & 0 & 0 & 0 & -3 & 0 & 0 & 0 & 1 \\ 0 & 0 & 0 & 0 & 0 & 0 & 0 & 0 & 0 & 0 & 0 & 0 & 0 & 3 & -3 & 1 \\ 0 & 0 & 0 & 0 & 0 & 0 & 0 & 0 & 0 & 0 & 0 & 0 & 0 & 0 & 0 & 1 \end{bmatrix}$ |
| 0 | 0 | 1 | 0 | 2 | B | $\begin{bmatrix} 0 & 0 & 0 & 0 & 3 & 0 & 0 & 0 & -3 & 0 & 0 & 0 & 1 & 0 & 0 & 0 \\ 0 & 0 & 0 & 0 & 3 & -9 & 9 & 0 & -3 & 9 & -9 & 0 & 1 & -3 & 3 & 0 \\ 0 & 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & 1 & -3 & 3 & 0 \end{bmatrix}$ |
| 0 | 0 | 1 | 1 | 3 | E | $\begin{bmatrix} 0 & 0 & 0 & 0 & 3 & 0 & 0 & 0 & -3 & 0 & 0 & 0 & 1 & 0 & 0 & 0 \\ 0 & 0 & 0 & 0 & 0 & 0 & 0 & 3 & 0 & 0 & 0 & -3 & 0 & 0 & 0 & 1 \\ 0 & 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & 0 & 0 & 0 & 1 \end{bmatrix}$ |
| 0 | 1 | 0 | 0 | 4 | B | $\begin{bmatrix} 0 & 3 & -3 & 1 & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 & 0 \\ 0 & 3 & -3 & 1 & 0 & -9 & 9 & -3 & 0 & 9 & -9 & 3 & 0 & 0 & 0 & 0 \\ 0 & 0 & 0 & 1 & 0 & 0 & 0 & -3 & 0 & 0 & 0 & 3 & 0 & 0 & 0 & 0 \end{bmatrix}$ |
| 0 | 1 | 0 | 1 | 5 | D | $\begin{bmatrix} 0 & 3 & -3 & 1 & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 3 & -3 & 1 \\ 0 & 0 & 0 & 0 & 0 & 0 & 0 & 0 & 0 & 0 & 0 & 0 & 0 & 0 & 0 & 1 \end{bmatrix}$ |
| 0 | 1 | 1 | 0 | 6 | F | $\begin{bmatrix} 0 & 1.5 & -1.5 & 0.5 & 1.5 & 0 & 0 & 0 & -1.5 & 0 & 0 & 0 & 0.5 & 0 & 0 & 0 \\ 0 & 0 & 0 & 1 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 1 & 0 & 0 & 0 \\ 0 & 0 & 0 & 0.5 & 0 & 0 & 0 & -1.5 & 0 & 0 & 0 & 1.5 & 0.5 & -1.5 & 1.5 & 0 \end{bmatrix}$ |
| 0 | 1 | 1 | 1 | 7 | C | $\begin{bmatrix} 0 & 0 & 0 & 0 & 0 & 9 & -9 & 3 & 0 & -9 & 9 & -3 & 0 & 3 & -3 & 1 \\ 0 & 0 & 0 & 1 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & 0 & 0 & 0 & 1 \end{bmatrix}$ |

Figure 13A

| $V_{i-1,j-1}$ | $V_{i+2,j-1}$ | $V_{i-1,j+2}$ | $V_{i+2,j+2}$ | bitmask | category | matrix |
|---|---|---|---|---|---|---|
| 1 | 0 | 0 | 0 | 8 | B | $\begin{bmatrix} 1 & 0 & 0 & 0 & 0 & 0 & 0 & 0 & 0 & 0 & 0 & 0 & 0 & 0 & 0 & 0 \\ 1 & -3 & 3 & 0 & 0 & 0 & 0 & 0 & 0 & 0 & 0 & 0 & 0 & 0 & 0 & 0 \\ 1 & 0 & 0 & 0 & -3 & 0 & 0 & 0 & 3 & 0 & 0 & 0 & 0 & 0 & 0 & 0 \\ 1 & -3 & 3 & 0 & -3 & 9 & -9 & 0 & 3 & -9 & 9 & 0 & 0 & 0 & 0 & 0 \end{bmatrix}$ |
| 1 | 0 | 0 | 1 | 9 | F | $\begin{bmatrix} 1 & 0 & 0 & 0 & 0 & 0 & 0 & 0 & 0 & 0 & 0 & 0 & 0 & 0 & 0 & 0 \\ 0.5 & -1.5 & 1.5 & 0 & 0 & 0 & 0 & 1.5 & 0 & 0 & 0 & -1.5 & 0 & 0 & 0 & 0.5 \\ 0.5 & 0 & 0 & 0 & -1.5 & 0 & 0 & 0 & 1.5 & 0 & 0 & 0 & 0 & 1.5 & -1.5 & 0.5 \\ 0 & 0 & 0 & 0 & 0 & 0 & 0 & 0 & 0 & 0 & 0 & 0 & 0 & 0 & 0 & 1 \end{bmatrix}$ |
| 1 | 0 | 1 | 0 | 10 | E | $\begin{bmatrix} 1 & 0 & 0 & 0 & 0 & 0 & 0 & 0 & 0 & 0 & 0 & 0 & 0 & 0 & 0 & 0 \\ 1 & -3 & 3 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 1 & -3 & 3 & 3 & 0 \end{bmatrix}$ |
| 1 | 0 | 1 | 1 | 11 | C | $\begin{bmatrix} 1 & 0 & 0 & 0 & 0 & 0 & 0 & 0 & 0 & 0 & 0 & 0 & 0 & 0 & 0 & 0 \\ 0 & 0 & 0 & 0 & 3 & -9 & 9 & 0 & -3 & 9 & -9 & 0 & 1 & -3 & 3 & 0 \\ 0 & 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & 0 & 0 & 0 & 1 \end{bmatrix}$ |
| 1 | 1 | 0 | 0 | 12 | D | $\begin{bmatrix} 1 & 0 & 0 & 0 & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 & 0 \\ 1 & 0 & 0 & 0 & -3 & 0 & 0 & 0 & 3 & 0 & 0 & 0 & 0 & 0 & 0 & 0 \\ 0 & 0 & 0 & 1 & 0 & 0 & 0 & -3 & 0 & 0 & 0 & 3 & 0 & 0 & 0 & 0 \end{bmatrix}$ |
| 1 | 1 | 0 | 1 | 13 | C | $\begin{bmatrix} 1 & 0 & 0 & 0 & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 & 0 \\ 0 & 3 & -3 & 1 & 0 & -9 & 9 & -3 & 0 & 9 & -9 & 3 & 0 & 0 & 0 & 0 \\ 0 & 0 & 0 & 0 & 0 & 0 & 0 & 0 & 0 & 0 & 0 & 0 & 0 & 0 & 0 & 1 \end{bmatrix}$ |
| 1 | 1 | 1 | 0 | 14 | C | $\begin{bmatrix} 1 & 0 & 0 & 0 & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 1 & 0 & 0 & 0 & 0 \\ 1 & -3 & 3 & 0 & -3 & 9 & -9 & 0 & 3 & -9 & 9 & 0 & 0 & 0 & 0 & 0 \end{bmatrix}$ |
| 1 | 1 | 1 | 1 | 15 | A | $\begin{bmatrix} 1 & 0 & 0 & 0 & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 0 & 0 & 0 & 0 & 1 \end{bmatrix}$ |

Figure 13B

METHOD AND SYSTEM FOR PERFORMING ROBUST REGULAR GRIDDED DATA RESAMPLING

FIELD OF INVENTION

The present invention is directed to regular gridded data resampling, and, in one embodiment, to a method and system for using robust regular gridded data resampling to account for missing data values when performing processing of image data, temperature data, relative humidity data and/or wind velocity data.

DISCUSSION OF THE BACKGROUND

Data resampling refers to recalculating the values of the samples at new locations, using a combination of the original values near those locations. For example, as shown in FIGS. 14A and 14B, in the context of image-based resampling, similar areas (e.g., from a Europe map) can be shown in different projections, such as geographic latitude/longitude (FIG. 14A) and Lambert Conformal Conic (LCC) (FIG. 14B). In an exemplary reprojection scenario, an original set of data is received in the geographic latitude/longitude format, but the received is data is only valid for the land portions and not the water portions, such as would exist in NASA's Land Surface Temperature Anomaly data sets. So all the land-based pixels are valid data and the water-based pixels are invalid (e.g., as represented by NaN, Inf, or a special out of range value like 99999.0). Since this data is in angular coordinates, the size of shapes closer to the poles are stretched, as evidenced by the comparison with the LCC projection of the same area (FIG. 14B). For example, the Scandanavian countries appear smaller in the LCC projection as compared to the geographic view.

A reprojection, therefore, from the geographic view to the LCC view warps each pixel in the image and requires resampling to be performed to create the output image as a regular grid of values. Three known modes of resampling include: nearest neighbor, bilinear, and cubic convolution. However, using known interpolation techniques, the invalid pixels can affect the output values of valid land pixels that are near the coast. In fact, for the cubic convolution algorithm, with its 4×4 neighborhood, it might make some of the smaller islands completely disappear into values (e.g., NaN or impossible values like 50000) representing invalid data points because every pixel on the island is within 3 pixels of a white no data pixel.

As described herein, data samples are assumed to lie on a regular grid that is indexed by a sequential series of integers. Pairs of floating point resampling coordinates that are to be evaluated are identified using (x,y) notation. Further, the floor(x) function is denoted [x], which returns the largest integer less than or equal to x. Also, dx is defined as dx=x−[x], which is the fractional portion of x in the [0, 1) range. For a given collection of data F, the notation $F_{i,j}$ is used as the value of the sample at integer coordinates (i,j).

For nearest neighbor resampling, the data sample closest to (x, y) is selected. The closest sample is in the 2×2 neighborhood of samples $F_{i,j}$, $F_{i+1,j}$, $F_{i,j+1}$, $F_{i+1,j+1}$. This is usually by testing dx<0.5 and dy<0.5 to determine which of the 4 neighboring samples is closest.

For bilinear resampling, the same 2×2 neighborhood of samples around the (x, y) coordinates is used, but a weighted average of those 4 values is calculated. The full expression for this weighted average is $F_{i,j}(1-dx)(1-dy)+F_{i+1,j}dx(1-dy)+F_{i,j+1}(1-dx)dy+F_{i+1,j+1}dxdy$ Through the separation of variables, it is possible to first pair-wise interpolate in one direction, and then interpolate those intermediate values in the orthogonal direction. The order is unimportant; the same result is calculated either way. So for example, each pair of samples in the same row is first averaged, and then those intermediate values are then averaged.

$top=F_{i,j}(1-dx)+F_{i+1,j}dx$ $bottom=F_{i,j+1}(1-dx)+F_{i+1,j+1}dx$ $value=top(1-dy)+bottom \cdot dy$ For cubic convolution resampling, a 4×4 sample neighborhood is used, using all the values from (i−1, j−1) to (i+2, j+2) inclusive. Again separation of variables is used to perform the calculations in one direction, then the other. The cubic convolution resampling function is actually a family of functions, parameterized by a value a in the [−1, 0) range. The full expression for this in the horizontal direction is:

$F_{i-1}(a \cdot dx^3 - 2a \cdot dx^2 + a \cdot dx) + F_i((a+2)dx^3 - (a+3)dx^2 + 1) + F_{i+1}(-(a+2)dx^3 + (2a+3)dx^2 - a \cdot dx) + F_{i+2}(-a \cdot dx^3 + a \cdot dx^2)$ This function is used for each of the four rows, j−1, j, j+1, j+2, and then the same function is used to interpolate those values using dy instead of dx. The most common value for 2-D resampling is a=−0.5, which reduces the interpolation to cubic Hermite spline interpolation. This yields a continuous resampled surface with a continuous first derivative, which looks best to the eye.

Such resampling functions expect that all the $F_{i,j}$ sample values are valid. However, this is not always the case, as data collections frequently define a "no data" value for samples that were not measured, and known methods can mask out unimportant samples to restrict the calculations. In both such cases, samples are utilized in the calculations that should not be. The worst case situation of this is when the original data set uses floating point values, and the "no data" value is set to the special value of Infinity or NaN (not a number). Any calculations involving these two special values will return the same special value. With nearest neighbor resampling, the number of "no data" samples generated is comparable to the number of "no data" samples in the input data set. With bilinear resampling, this means that each "no data" sample can affect a 3×3 neighborhood centered on it, since it could be any of the samples in the 2×2 neighborhood used in the weighted average calculations. With cubic convolution resampling, the "no data" sample can affect a 7×7 neighborhood centered on it, since it could be any of the samples in the 4×4 neighborhood used in the calculations. So the resampled output can have a lot more "no data" values than the original data set, which can severely affect the utility of the resampled data set.

BRIEF DESCRIPTION OF THE DRAWINGS

The following description, given with respect to the attached drawings, may be better understood with reference to the non-limiting examples of the drawings, wherein:

FIG. 4 is a mapping of bitmasks to valid sample locations for nearest neighbor calculations;

FIG. 5A is a lookup table showing a mapping from validity bitmasks and half-quadrant indices to a row index as part of a nearest neighbor calculation;

FIG. 5B is a lookup table showing a mapping from validity bitmasks and half-quadrant indices to a column index as part of a nearest neighbor calculation;

FIG. 6 is a lookup table showing a mapping from validity bitmasks and half-quadrant indices to a sample index as part of a nearest neighbor calculation;

FIG. 7 is a table of equations indexed by bitmasks used as part of a bilinear resampling method;

FIG. 8 is a mapping of original values to adjusted values indexed by bitmasks and used as part of a bilinear resampling method;

FIG. 10 is a flowchart showing a second embodiment of a method for performing a branch-based bilinear resampling technique;

FIG. 11 is a lookup table for calculating adjusted values using matrix multiplication as part of a parallel bilinear resampling technique;

FIGS. 13A and 13B are a lookup table for performing a parallel version of cubic convolution utilizing matrix multiplication.

DISCUSSION OF THE PREFERRED EMBODIMENTS

The various Robust Regular Gridded Data Resampling methods and systems described herein ignore or replace the bad samples with some combination of the good sample values in the neighborhood being processed. As used herein, "V" is a complementary data set of the same dimensions as F. Each value $V_{i,j}$ is a Boolean that indicates whether the corresponding sample $F_{i,j}$ is valid or if it has a "no data" value, has been masked out, or for any other reason should be considered invalid. The three different resampling modes use different logic to overcome the bad samples, and are discussed separately. While the methods described herein may not remove all bad values, the number of bad samples in the output will be on the same order of magnitude as the number of bad samples in the input, as opposed to being increased.

Nearest Neighbor Resampling Mode

The Nearest Neighbor resampling mode takes the input resample coordinate (x, y), truncates the values to i=[x], j=[y], and also calculates the fractional coordinate components dx=x−i, dy=y−j. The 2×2 neighborhood of sample and validity values $F_{i,j}, F_{i+1,j}, F_{i,j+1}, F_{i+1,j+1}$ and $V_{i,j}, V_{i+1,j}, V_{i,j+1}, V_{i+1,j+1}$ are used. The dx and dy values are used to determine which quadrant the (x, y) coordinate is in. The resampled output can then be calculated, such as in the branch-based and parallel implementations described below.

Nearest Neighbor Resampling Mode—Branch-Based Version

Having determined what quadrant the (x,y) coordinate is in, the method determines if the sample in that quadrant is valid, and, if it is, then the value of the sample is returned. If the sample in that quadrant is not valid, the closest valid pixel to the quadrant is returned. The first candidate for the closest sample is the adjacent one closer to (x,y), then the other adjacent sample, and finally the opposite corner sample. If all samples are invalid, the return value is an invalid sample.

Figure 1A:
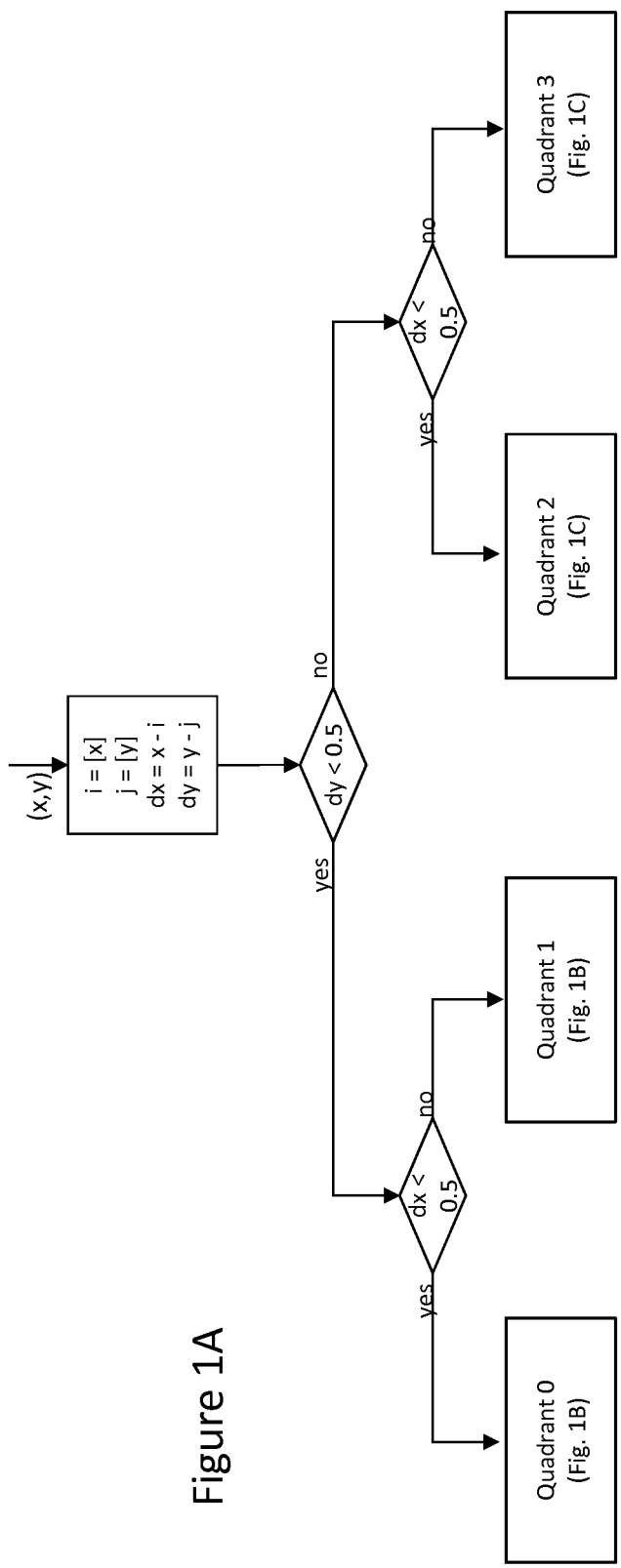
FIGS. 1A-1C are a flowchart showing a branch-based nearest neighbor processing method.
Figure 1B:
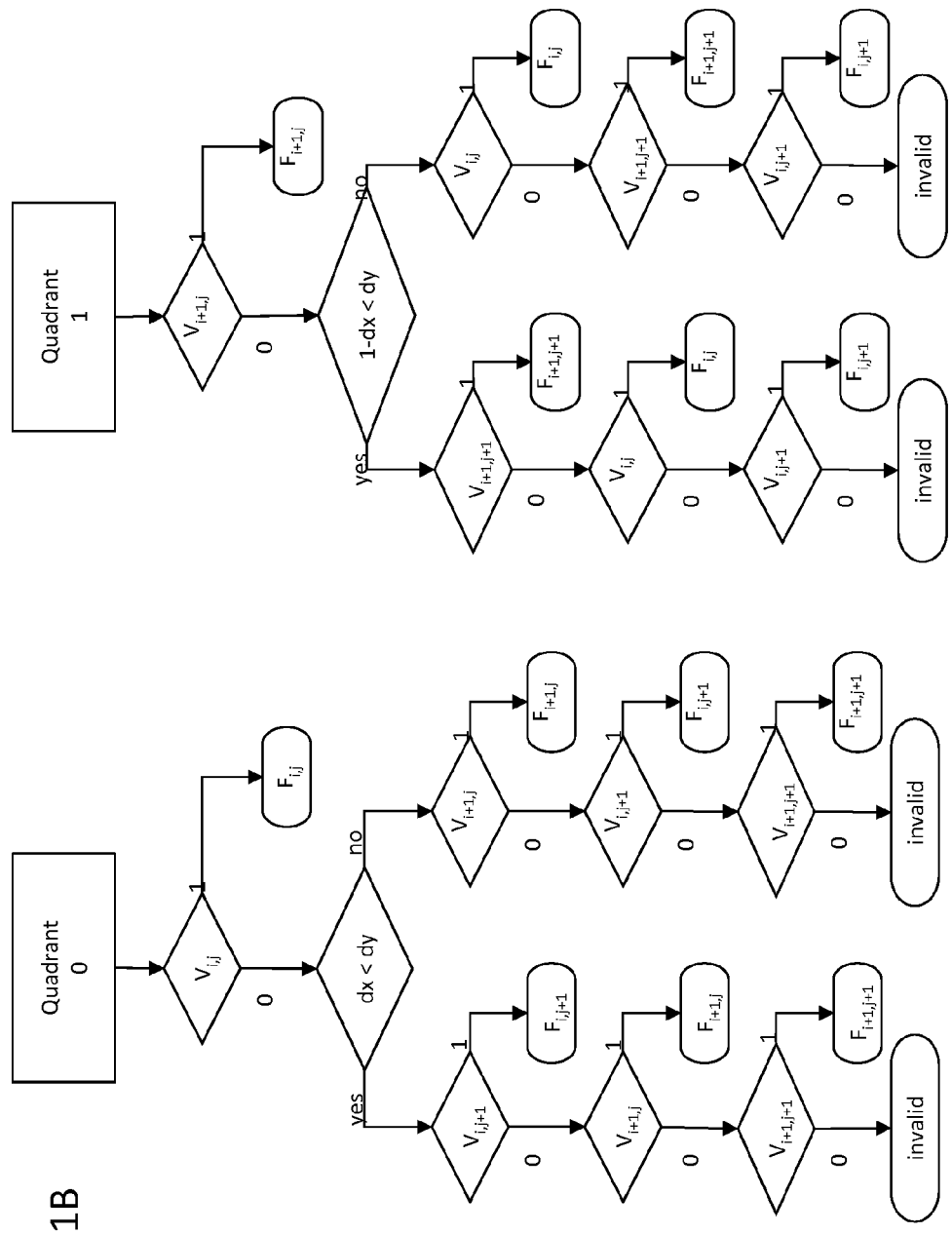
Figure 1C:
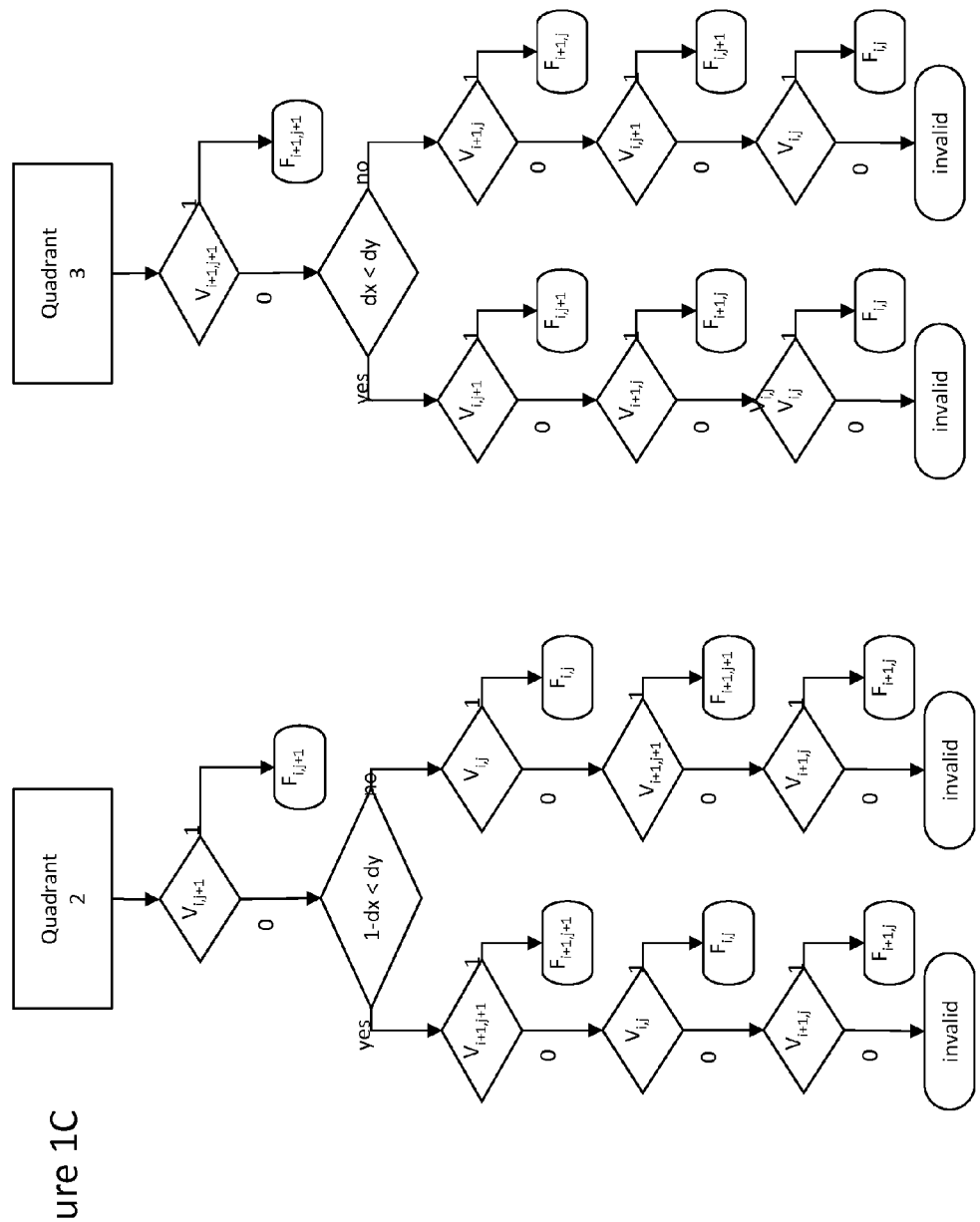

An implementation of this version is shown in FIG. 1, which, after calculating i, j, dx and dy, determines what quadrant to use by first comparing dy<0.5 at a first level of the branch tree and branching to an appropriate second level of the tree. If dy<0.5 in the first level, control passes to the left branch to determine in the second level if dx<0.5 as well. If so, then the control again passes to the left branch (to a third level) indicating that the "0" quadrant is to be used and the closest pixel is (i,j). The method then tests whether (i,j) is a valid value by testing whether $V_{i,j}$ is 1. If so, $F_{i,j}$ is used as the resampled output. If $V_{i,j}$ is not valid, then the method determines the next closest pixel by determining whether dx<dy. If so, then (i,j+1) is closer than (i+1,j), and the method determines if (i,j+1) is valid (by checking $V_{i,j+1}$). If so, then $F_{i,j+1}$ is used, otherwise, $V_{i+1,j}$ is used if it is valid. If $V_{i+1,j}$ is also not valid, then $V_{i+1,j+1}$ is used if it is valid. If $V_{i+1,j+1}$ is also invalid, then the point is invalid (as no valid value can be determined).

If in the second level it was determined that dx was not less than 0.5, then control would have passed to the right branch (to the third level) indicating that the "1" quadrant is to be used and the closest pixel is (i+1,j). Each of the bottom six levels of the tree would then be evaluated (similar to the steps taken for quadrant "0").

Similar processing is also performed for quadrants "2" and "3" if, in the first level, it is determined that dy is not less than 0.5. (In addition, as would be appreciated by one of ordinary skill in the art, it is possible to use alternate orders for determining the quadrants (e.g., first checking dx<0.5 then checking dy<0.5) without departing from the teachings of this specification.)

However, utilizing such a hierarchy of branching may result in slow-downs in an environment that can perform instructions in parallel but which has performance penalties for branches. As a result, it is possible to use a more parallel approach as described below.

Nearest Neighbor Resampling Mode—Parallel Version

Like with the branch-based version, the parallel version initially determines the values for i, j, dx and dy. A bitmask is then calculated from the Boolean comparison values of dx and dy against 0.5. (While comparisons (dy>=0.5 and dx>=0.5) are used to generate the bitmask, no branch operation is used to select one of two branches for further processing, thereby avoiding branching delays.) The quadrant bitmask is evaluated (using the bitwise OR operator "∨", which in programming languages such as C and C++ is written as "|") as:

$$\text{bitmask}_q = ((dy \geq 0.5) << 1) \vee (dx \geq 0.5)$$

This results in the bitmask having the values shown in Table 1 (and having bitmasks with values corresponding to the quadrants 0-3 discussed above with respect to the branch-based version).

TABLE 1

| bitmask$_q$ (binary) | bitmask$_q$ (decimal) | dx range | dy range | quadrant |
|---|---|---|---|---|
| 00 | 0 | [0, 0.5) | [0, 0.5) | upper left |
| 01 | 1 | [0.5, 1) | [0, 0.5) | upper right |
| 10 | 2 | [0, 0.5) | [0.5, 1) | lower left |
| 11 | 3 | [0.5, 1) | [0.5, 1) | lower right |

Ideally, as with the branch-based version, the quadrant indicates which input sample to use as the output value, but if that sample is invalid then the closest of the remaining valid samples, if any, is identified. Preferably one of the adjacent samples is used if either is valid, and the opposite corner sample is used only when the other three are invalid.

If (x, y) is in the upper left or lower right quadrant, then dx and dy are compared to see which of the adjacent samples $F_{i+1,j}$ or $F_{i,j+1}$ is closer. $F_{i,j+1}$ is closer if dy>dx, and $F_{i+1,j}$ is closer otherwise. If (x, y) is in the upper right or lower left quadrant, then (1−dx) and dy are compared to see which of the adjacent samples $F_{i,j}$ or $F_{i+1,j+1}$ is closer. $F_{i+1,j+1}$ is closer if dy>(1−dx) and $F_{i,j}$ is closer otherwise.

In an embodiment that reduces the use of branching, both Boolean values (dx>dy) and ((1−dx)>dy) are calculated and put in a 2-element array:

[(dx>dy)(1−dx)>dy].

Then a 4-element lookup table (LUT) is used to get the index into this array for the appropriate value. Preferably this LUT uses the quadrant bitmask as the index as shown in Table 2.

TABLE 2

| bitmask$_q$ (binary) | bitmask (decimal) | LUT value |
|---|---|---|
| 00 | 0 | 0 |
| 01 | 1 | 1 |
| 10 | 2 | 1 |
| 11 | 3 | 0 |

Table 2 can also be expressed as the logical exclusive or-ing of the row/column identifications:

LUT=(dy≥0.5)⊕(dx≥0.5)

This divides each quadrant into two triangles, which can be uniquely identified by combining the quadrant bitmask and the dx vs dy comparison value for the appropriate quadrant as shown in Table 3.

TABLE 3

| bitmask$_q$ (binary) | dy range | dx range | dx vs. dy quadrant comparison | result of dx vs. dy quadrant comparison | half quadrant (hq) index (decimal) |
|---|---|---|---|---|---|
| 00 | [0, 0.5) | [0, 0.5) | dx > dy | 0 | 0 |
| 00 | [0, 0.5) | [0, 0.5) | dx > dy | 1 | 1 |
| 01 | [0, 0.5) | [0.5, 1) | (1 − dx) > dy | 0 | 2 |
| 01 | [0, 0.5) | [0.5, 1) | (1 − dx) > dy | 1 | 3 |
| 10 | [0.5, 1) | [0, 0.5) | (1 − dx) > dy | 0 | 4 |
| 10 | [0.5, 1) | [0, 0.5) | (1 − dx) > dy | 1 | 5 |
| 11 | [0.5, 1) | [0.5, 1) | dx < dy | 0 | 6 |
| 11 | [0.5, 1) | [0.5, 1) | dx >= dy | 1 | 7 |

The half quadrant index (index$_{hq}$) of Table 3 can be expressed in a single expression in terms of dx and dy as:

$$\text{index}_{hq} = ((dy \geq 0.5) \ll 2) \vee ((dx \geq 0.5) \ll 1) \vee \left( \left\{ \begin{array}{c} dx > dy \\ (1-dx) > dy \end{array} \right\} [(dy \geq 0.5) \oplus (dx \geq 0.5)] \right)$$

Figure 2:
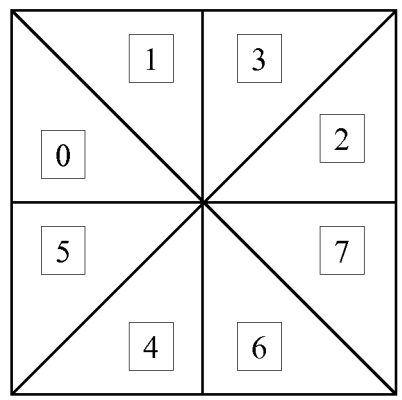
FIG. 2 is a schematic diagram of half-quadrants used to determine a nearest neighbor point/sample during a nearest neighbor processing method.
Figure 3:
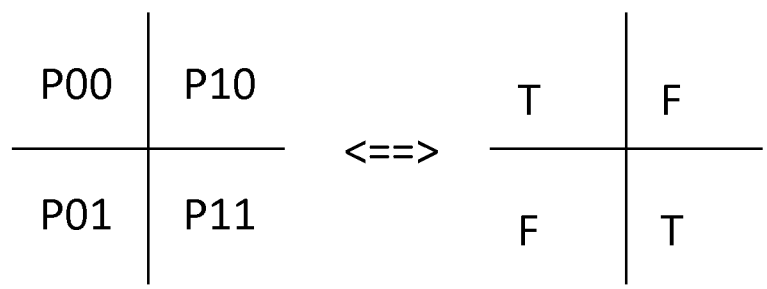
FIG. 3 is a schematic diagram of a mapping of exemplary validity information relating to nearest neighbor calculations.

The resulting triangles (and their indices) can be visualized as shown in FIG. 2. The half-quadrant bitmasks can then be combined with the orthogonal concept of sample validity. An exemplary Boolean validity neighborhood for $V_{i,j}$=T, $V_{i+1,j}$=F, $V_{i,j+1}$=F, $V_{i+1,j+1}$=T can then be represented as shown in FIG. 3 which shows which of the samples, if any, are valid.

Treating the V values as bits in a bitmask gives:

bitmask=($V_{i,j}$<<3) ∨ ($V_{i+1,j}$<<2) ∨ ($V_{i,j+1}$<<1) ∨ $V_{i+1,j+1}$

This allows the 16 permutations of sample validity to be enumerated (in binary or decimal form), which can be visualized as shown in FIG. 4. The validity bitmask values and half-quadrant index can then be used to form a pair of 16×8 LUTs that define which sample to identify as the nearest neighbor. One LUT (FIG. 5A) defines which row value to use and the other (FIG. 5B) defines which column to use. The return values of these two table lookups are used to identify which of the 4 input samples to return as the output. A table index is constructed from the two offsets, using the column offset as the high bit and the row offset as the low bit:

output={$F_{i,j}$,$F_{i+1,j}$,$F_{i,j+1}$,$F_{i+1,j+1}$}[(row<<1) ∨ column]

The validity of the resampled output value is also determined. The resampled value will be valid unless all four samples in the 2×2 neighborhood are invalid. Thus, the validity bitmask can be used to index into a table, where index 0 is invalid and the rest of the table is valid. Alternatively, a combined lookup table can be created (as shown in FIG. 6) that includes the column and row information pre-combined into a single entry in binary form on an index-by-index basis which is similarly used to index into:

output={$F_{i,j}$,$F_{i+1,j}$,$F_{i,j+1}$,$F_{i+1,j+1}$}[index]

As can be seen from FIG. 6, in the case of a validity mask of 1111 (binary), all of the samples are valid, so for all points in all quadrants and half quadrants, the point selected is the corner point for that quadrant (which is the closest point). That is, for points in quadrant 0 (half quadrants 0 and 1), the selected point is $F_{i,j}$ which corresponds to index 0. Similarly, for points in quadrants 1-3, respectively, the selected point is $F_{i+1,j}$, $F_{i,j+1}$, and $F_{i+1,j+1}$, respectively, which correspond to indices 1-3, respectively.

If instead, the validity mask was 0111 (binary), then the upper left hand sample is not valid and the system cannot chose the upper left hand quadrant (quadrant 0) to be the selected sample when the point is nearest the upper left hand corner. Instead, the lowest order bit of the half quadrant index will be set by the calculation of (dx>dy). If (dx>dy) evaluates to "0", then the index will be 000 (binary), otherwise the index will be 001 (binary). This means that the returned value from the table of FIG. 6 is 10 (binary) for an index of 000 (binary) and 01 (binary) for an index of 001 (binary), which correspond to $F_{i+1,j}$ and $F_{i,j+1}$, respectively.

Nearest Neighbor Resampling Mode—Function Table Version

Rather than utilize individual branches for the various conditions or the parallel version, it is instead possible to use a function table that contains pointers to the code to be run based on the conditions for a pixel being resampled, thereby selecting the appropriate code in a single branch per pixel. Similar to the lookup table of FIG. 6, instead of an index into an array being returned, a function pointer could instead be returned that points to the code to be executed for the appropriate one of the five cases: the resampled value is invalid, is equal to the appropriate one of $F_{i,j}$, $F_{i+1,j}$, $F_{i,j+1}$, and $F_{i+1,j+1}$ (as specified by the index of FIG. 6).

Bilinear Mode

The bilinear resampling mode uses the same 2×2 neighborhood of samples around input resample coordinate (x, y) that the nearest neighbor mode does. The values are truncated so that i=[x], j=[y], and the fractional coordinate components dx=x−i, dy=y−j are calculated. The 2×2 neighborhood of sample and validity values $F_{i,j}$, $F_{i+1,j}$, $F_{i,j+1}$, $F_{i+1,j+1}$ and $V_{i,j}$, $V_{i+1,j}$, $V_{i,j+1}$, $V_{i+1,j+1}$ are specified as above. The validity values are used to identify which samples can be left as is and which need to be recalculated from the valid sample values. The expression used to recalculate invalid samples varies depending on how many invalid samples there are. The valid sample values are used to define a plane, and the invalid samples are calculated to also lie in that plane. When there is only one valid sample, the plane is parallel to the xy-plane. When there are two valid samples, the plane is defined by the line connecting the two valid samples and the line orthogonal to it which is parallel to the xy-plane. When there are three valid samples, those samples uniquely define a plane. When all four samples are valid, there is no need to recalculate any values, so no plane is necessary. When all four samples are invalid, the output value is an invalid sample, so no plane is necessary.

Once the invalid sample values have been recalculated, then the standard bilinear resampling equation is used:

$$F_{i,j}(1-dx)(1-dy)+F_{i+1,j}dx(1-dy)+F_{i,j+1}(1-dx)dy+F_{i+1,j+1}dxdy$$

Like with the Nearest Neighbor mode, a bitmask is built from the validity values such that:

$$\text{bitmask}=(V_{i,j}<<3) \vee (V_{i+1,j}<<2) \vee (V_{i,j+1}<<1) \vee V_{i+1,j+1}$$

The 16 permutations for validity bitmask can be reduced to 5 categories, which each have different behaviors as shown in Table 4.

TABLE 4

| category | validity | number | bitmasks | output behavior |
|---|---|---|---|---|
| A | all 4 invalid | 1 | 0 | sample invalid |
| B | 1 valid, 3 invalid | 4 | 1, 2, 4, 8 | equal to lone valid sample |
| C | 2 valid, 2 invalid | 6 | 3, 5, 6, 9, 10, 12 | linear interpolation between valid samples |
| D | 3 valid, 1 invalid | 4 | 7, 11, 13, 14 | barycentric interpolation of 3 valid samples |
| E | all 4 valid | 1 | 15 | normal bilinear interpolation |

Category A, with all 4 samples invalid, can have any output value, because it is the one case where the output value is invalid. Category B, with only 1 valid sample and 3 invalid samples, will return the value of that one valid sample. Category C, with 2 valid and 2 invalid samples, has two subcategories. The larger and easier subcategory is when the 2 valid samples are in the same row or column. In this case the output is equal to the linear interpolation between those two values, using the appropriate dx or dy value.

The other subcategory is when the 2 valid samples are in opposite corners. In this case linear interpolation is still performed between them, but the interpolation parameter is the normalized distance from the line orthogonal to the one connecting the two valid samples which passes through one of them. For example, a validity bitmask of 6 has the samples $F_{i+1,j}$ and $F_{i,j+1}$ valid. Using the standard linear interpolation equation $$\text{output}=F_{i,j+1}(1-d)+F_{i+1,j}\cdot d$$

The normalized distance from the line orthogonal to the vector <1, −1> which passes through (0, 1) is used. This line has the equation x−y+1=0. The distance from a point (dx, dy) to the line Ax+By+C=0 can be calculated as:

$$d = \frac{|A\cdot dx + B\cdot dy + C|}{\sqrt{A^2+B^2}} = \frac{|dx-dy+1|}{\sqrt{2}}$$

Since both dx and dy are constrained to the [0, 1) range, the numerator can never be negative, so the absolute value can be removed. This value is then scaled so that d=1 at the point (1, 0):

$$d' = \alpha d$$

$$d'(1,0) = 1 = \alpha \frac{1-0+1}{\sqrt{2}} = \alpha\sqrt{2} \Rightarrow \alpha = \frac{1}{\sqrt{2}}$$

$$d' = \frac{dx-dy+1}{2}$$

Using this normalized distance in the linear interpolation function yields:

$$\text{output} = F_{i,j+1}\left(1-\frac{dx-dy+1}{2}\right) + F_{i+1,j}\frac{dx-dy+1}{2}$$

$$\text{output} = F_{i,j+1}\frac{dy-dx+1}{2} + F_{i+1,j}\frac{dx-dy+1}{2}$$

$$\text{output} = \frac{F_{i,j+1}+F_{i+1,j}}{2} + \frac{F_{i+1,j}-F_{i,j+1}}{2}dx + \frac{F_{i,j+1}-F_{i+1,j}}{2}dy$$

The other diagonal case is validity bitmask 9, where $F_{i,j}$ and $F_{i+1,j+1}$ are valid. This time the interpolation factor is the normalized distance to the line x+y=0, and the expression for the interpolation output is:

$$\text{output} = F_{i,j} + \frac{F_{i+1,j+1}-F_{i,j}}{2}dx + \frac{F_{i+1,j+1}-F_{i,j}}{2}dy$$

Category D, when 3 samples are valid and 1 is invalid, is more complex. In such a case normal linear interpolation cannot be performed between 2 of the valid samples and then a second linear interpolation of the first result with the third point. If the results from both ways (horizontal then vertical vs. vertical then horizontal) are calculated, different results are obtained, contrary to expectations that the interpolation should be invariant to a transpose of the input data. Instead, a different approach is used using barycentric coordinates.

Validity bitmask 14 (decimal) (or 1110 binary) is one of the barycentric situations, with samples $F_{i,j}$, $F_{i+1,j}$, and $F_{i,j+1}$ being valid. The barycentric coordinates $\lambda_{0,0}$, $\lambda_{1,0}$, and $\lambda_{0,1}$ are then defined so that the interpolation output is:

$$\text{output} = \lambda_{0,0} F_{i,j} + \lambda_{1,0} F_{i+1,j} + \lambda_{0,1} F_{i,j+1}$$

By definition barycentric coordinates are subject to a unity constraint:

$$\lambda_{0,0} + \lambda_{1,0} + \lambda_{0,1} = 1$$

The expressions for the barycentric coordinates of the interpolation point (dx, dy) are used in terms of the coordinates of the samples:

$$dx = \lambda_{0,0} F_{i,j_x} + \lambda_{1,0} F_{i+1,j_x} + \lambda_{0,1} F_{i,j+1_x}$$

$$dy = \lambda_{0,0} F_{i,j_y} + \lambda_{1,0} F_{i+1,j_y} + \lambda_{0,1} F_{i,j+1_y}$$

$$dx = \lambda_{0,0} \cdot 0 + \lambda_{1,0} \cdot 1 + \lambda_{i,j+1} \cdot 0 \Rightarrow \lambda_{1,0} = dx$$

$$dy = \lambda_{0,0} \cdot 0 + \lambda_{1,0} \cdot 0 + \lambda_{i,j+1} \cdot 1 \Rightarrow \lambda_{0,1} = dy$$

The unity constraint can then be used to get an expression for the third barycentric coordinate in terms of x and dy:

$$\lambda_{0,0} = 1 - \lambda_{1,0} - \lambda_{0,1} = 1 - dx - dy$$

The three barycentric coordinates can then be plugged into the interpolation function:

$$\text{output} = F_{i,j}(1-dx-dy) + F_{i+1,j} dx + F_{i,j+1} dy$$

$$\text{output} = F_{i,j} + (F_{i+1,j} - F_{i,j}) dx + (F_{i,j+1} - F_{i,j}) dy$$

Similar analysis can be performed on the other three barycentric cases. Category E, where all 4 samples are valid, uses the standard bilinear interpolation expression. The reduced versions of the equations for the resampled outputs for all five cases are summarized in the sixteen equations of FIG. 7.

While it is possible to use the 16 separate equations to calculate the resampled outputs, it is also possible to use a single equation to calculate the standard bilinear interpolation expression with recalculated values that replace the invalid values such that when the recalculated values are plugged into the full bilinear interpolation equation they will reduce to the equations in the FIG. 7. To achieve this, instead of using the original values for $F_{i,j}$, $F_{i+1,j}$, $F_{i,j+1}$, and $F_{i+1,j+1}$ in the bilinear interpolation expression, adjusted values $F'_{i,j}$, $F'_{i+1,j}$, $F'_{i,j+1}$, and $F'_{i+1,j+1}$, respectively, are used in their places. For each of the 15 bitmasks with one or more invalid samples, the invalid sample values can be calculated by plugging in their dx/dy coordinates into the equation for that case. Doing this yields the adjusted values ($F'_{i,j}$, $F'_{i+1,j}$, $F'_{i,j+1}$, and $F'_{i+1,j+1}$) for each sample as shown in FIG. 8.

Thus, for example, for bitmask 1 (0001 in binary), where only $F_{i+1,j+1}$ is valid, the values $F'_{i,j}$, $F'_{i+1,j}$, and $F'_{i,j+1}$ are all set equal to $F_{i+1,j+1}$, and $F'_{i+1,j+1}$ stays equal to its original value $F_{i+1,j+1}$. Thus, when the adjusted value bilinear interpolation expression is calculated, the output is equal to the only valid value. That is, for bitmask 1:

$$F'_{i,j}(1-dx)(1-dy) + F'_{i+1,j} dx(1-dy) + F'_{i,j+1}(1-dx)dy + F'_{i+1,j+1} dx\, dy = F_{i+1,j+1}.$$

Similarly, for example, for bitmask 6 (0110 in binary), where only $F_{i+1,j}$ and $F_{i,j+1}$ are valid, the values $F'_{i,j}$ and $F'_{i+1,j+1}$ are both set equal to $0.5^*(F_{i+1,j} + F_{i,j+1})$ and $F'_{i+1,j}$ and $F'_{i,j+1}$ stay equal to their original values $F_{i+1,j}$ and $F_{i,j+1}$. Thus, when the adjusted value bilinear interpolation expression is calculated, the output is equal to the equation corresponding to bitmask 6 in FIG. 7 (i.e., $0.5^*(F_{i+1,j} + F_{i,j+1}) + 0.5^*(F_{i+1,j} - F_{i,j+1})^* dx + 0.5^*(F_{i,j+1} - F_{i+1,j})^* dy$).

Like with the Nearest Neighbor Mode, the Bilinear Mode can be performed as either a Branch-Based Version or a Parallel Version.

Bilinear Mode—Branch-Based Version

Figure 9:
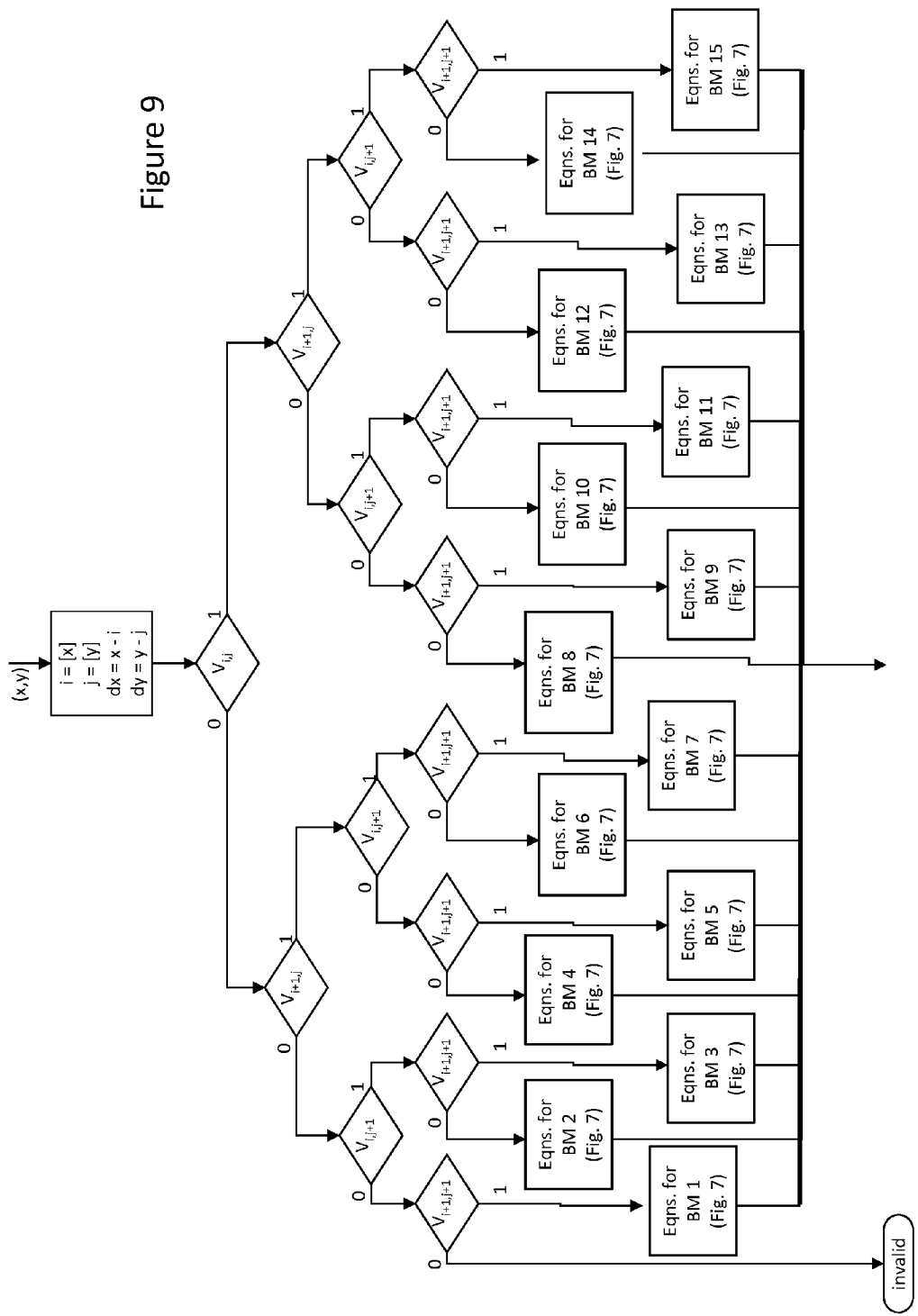
FIG. 9 is a flowchart showing a first embodiment of a method for performing a branch-based bilinear resampling technique.

As shown in FIG. 9, a Branch-Based version of the bilinear mode can be implemented which determines which of the values are valid and branches to successively lower levels until the equation is found for the current validity conditions. The method first determines (in the first level) whether the pixel at (i,j) is valid or invalid by determining a value of $V_{i,j}$. If $V_{i,j}$ is 0 (indicating an invalid pixel), then control passes to the left branch (to the second level) where the method determines if $V_{i+1,j}$ indicates a valid or invalid value. The process then determines (in the third level) whether $V_{i,j+1}$ indicates a valid or invalid value, and finally, in the fourth level, the method determines if $V_{i+1,j+1}$ indicates a valid or invalid value. After the four-level comparison, the method has determined which of the sixteen possible combinations of $V_{i,j}$, $V_{i+1,j}$, $V_{i,j+1}$, and $V_{i+1,j+1}$ are present. (As would be understood by those of ordinary skill in the art, other orders for determining the sixteen possible combinations of $V_{i,j}$, $V_{i+1,j}$, $V_{i,j+1}$, and $V_{i+1,j+1}$ are also possible without departing from the method described herein, e.g., by starting with $V_{i+1,j+1}$ in the first level and ending with $V_{i,j}$ in the fourth level.) The method can then utilize the corresponding equation (summarized in FIG. 7) for the current validity conditions.

As shown in FIG. 10, instead of using a validity condition-specific equation to calculate the resampled output, the method can instead calculate the adjusted values $F'_{i,j}$, $F'_{i+1,j}$, $F'_{i,j+1}$, and $F'_{i+1,j+1}$ (according to the table of FIG. 8) and then use the common equation:

$$F'_{i,j}(1-dx)(1-dy) + F'_{i+1,j} dx(1-dy) + F'_{i,j+1}(1-dx)dy + F'_{i+1,j+1} dx\, dy.$$

Bilinear Mode—Parallel Version

Like with the Nearest Neighbor mode, the use of a multi-level branching hierarchy can degrade system performance. Accordingly, instead of a branch-based version, the Bilinear mode may instead be implemented in a parallel version based on the adjusted values ($F'_{i,j}$, $F'_{i+1,j}$, $F'_{i,j+1}$, and $F'_{i+1,j+1}$). The table of FIG. 8 can be represented by a 16-element array of 4×4 matrices, since all the elements in the table are linear combinations of the original values. The validity bitmask can be used to index into the 16-element array thereby creating a 16×4×4 lookup table (as shown in FIG. 11), where each row can be treated as the matrix to transform a column vector of the input sample values $<F_{i,j}$, $F_{i+1,j}$, $F_{i,j+1}$, $F_{i+1,j+1}>$.

It is not uncommon for floating point data sets to use the special value NAN ("Not A Number") or infinity as their "no data" value. Unfortunately, the IEEE rules for floating point math state that any value added to or multiplied by an NAN will yield NAN. Similarly, multiplication of zero by infinity also results in NAN. So even though the matrices in the lookup table will always have a 0 in each column that corresponds to an invalid sample, these special values will not be properly replaced as multiplying the special values by zero does not return zero (as would be needed to perform the matrix multiplication). So any special values need to be identified and replaced with some other value (which when multiplied by zero will give zero) before performing the matrix multiplication. The special values can nonetheless be identified, without branching, as multiplication of the special values by zero will not result in a value of zero. So for each sample value of the 4 input sample values a 2-element array can be constructed that includes 0 and the sample value. The array can then be indexed by using the Boolean return value of the comparison of zero with the result of the multiplication of the sample value with itself. For example, a lookup table called FiniteLUT can be created as follows:

$$FiniteLUT = \begin{bmatrix} 0 & F_{i,j} \\ 0 & F_{i+1,j} \\ 0 & F_{i,j+1} \\ 0 & F_{i+1,j+1} \end{bmatrix}.$$

An array (e.g., isFinite) then can be set to be the result of the comparisons of zero with the result of the multiplication of the sample values with zero, as follows:

$$isFinite = \begin{bmatrix} 0*F_{i,j} == 0 \\ 0*F_{i+1,j} == 0 \\ 0*F_{i,j+1} == 0 \\ 0*F_{i+1,j+1} == 0 \end{bmatrix},$$

and an array of modified F values (e.g., mFV) can be created such that:

$$mFV = \begin{bmatrix} FiniteLUT[isFinite[0]][0] \\ FiniteLUT[isFinite[1]][1] \\ FiniteLUT[isFinite[2]][2] \\ FiniteLUT[isFinite[3]][3] \end{bmatrix}.$$

Thus, in matrix form, the adjusted values are calculated as:

$$\begin{bmatrix} F'_{i,j} \\ F'_{i+1,j} \\ F'_{i,j+1} \\ F'_{i+1,j+1} \end{bmatrix} =$$

$$\begin{bmatrix} LUT[bm][0][0] & LUT[bm][1][0] & LUT[bm][2][0] & LUT[bm][3][0] \\ LUT[bm][0][1] & LUT[bm][1][1] & LUT[bm][2][1] & LUT[bm][3][1] \\ LUT[bm][0][2] & LUT[bm][1][2] & LUT[bm][2][2] & LUT[bm][3][2] \\ LUT[bm][0][3] & LUT[bm][1][3] & LUT[bm][2][3] & LUT[bm][3][3] \end{bmatrix} \begin{bmatrix} mFV[0] \\ mFV[1] \\ mFV[2] \\ mFV[3] \end{bmatrix}$$

where "bm" is the bitmask value and LUT is the lookup table created from the 16-element array of 4×4 matrices, significantly reducing branching. As a result, for example when the bitmask is "3" (bm=3), then (using the lookup table of FIG. 11 and the mFV array) the matrix equation would become:

$$\begin{bmatrix} F'_{i,j} \\ F'_{i+1,j} \\ F'_{i,j+1} \\ F'_{i+1,j+1} \end{bmatrix} = \begin{bmatrix} 0 & 0 & 1 & 0 \\ 0 & 0 & 0 & 1 \\ 0 & 0 & 1 & 0 \\ 0 & 0 & 0 & 1 \end{bmatrix} \begin{bmatrix} 0 \\ 0 \\ F_{i,j+1} \\ F_{i+1,j+1} \end{bmatrix}.$$

and the values for $F'_{i,j}$, $F'_{i+1,j}$, $F'_{i,j+1}$, and $F'_{i+1,j+1}$ become set as shown in FIG. 9 for bitmask 3.

The resulting adjusted (or transformed) values ($F'_{i,j}$, $F'_{i+1,j}$, $F'_{i,j+1}$, and $F'_{i+1,j+1}$) are then passed into the standard bilinear interpolation equation.

Bilinear Mode—Function Table-Based Version

Rather than utilize individual branches for the various conditions or the parallel version, it is instead possible to use a function table that contains pointers to the code to be run based on the conditions for a pixel being resampled, thereby selecting the appropriate code in a single branch per pixel. Having calculated the bitmask as described above, a function lookup table can be used to jump to the code to calculate the appropriate one of the 16 different cases of either FIG. 7 or FIG. 8, once per pixel.

Cubic Convolution Mode

The cubic convolution resampling mode uses a larger 4×4 neighborhood of samples around input resampling coordinate (x, y) than the nearest neighbor or bilinear mode does. The 2×2 neighborhood used in the other modes are in the center of this 4×4 neighborhood, so the samples involved range from (i−1, j−1) to (i+2, j+2). The values are truncated to i=[x], j=[y], and the fractional coordinate components dx=x−i, dy=y−j are calculated. The 4×4 neighborhood of sample and validity values $F_{i-1,j-1}$, $F_{i,j-1}$, $F_{i+1,j-1}$, $F_{i+2,j-1}$, $F_{i-1,j}$, $F_{i,j}$, $F_{i+1,j}$, $F_{i+2,j}$, $F_{1-1,j+1}$, $F_{i,j+1}$, $F_{i+1,j+1}$, $F_{i+2,j+1}$, $F_{i-1,j+2}$, $F_{i,j+2}$, $F_{i+1,j+2}$, $F_{i+2,j+2}$, and $V_{i-1,j-1}$, $V_{i,j-1}$, $V_{i+1,j-1}$, $V_{i+2,j-1}$, $V_{i-1,j}$, $V_{i,j}$, $V_{i+1,j}$, $V_{i+2,j}$, $V_{i-1,j+1}$, $V_{i,j+1}$, $V_{i+1,j+1}$, $V_{i+2,j+1}$, $V_{i-1,j+2}$, $V_{i,j+2}$, $V_{i+1,j+2}$, $V_{i+2,j+2}$ are used. The dx and dy values are still constrained to the range [0, 1), and the interpolation using these 16 samples is only valid inside the box formed by $F_{i,j}$, $F_{i+1,j}$, $F_{i,j+1}$, and $F_{i+1,j+1}$. If data is resampled right at the edge of the data (i=0, j=0, i=max(i), j=max(j)) then the corresponding row and/or column of validity values is set to false so that the cubic approximation can be maintained across the whole surface.

When all the samples are valid, the interpolated surface passes exactly through the samples at the corners of the interpolation range, $F_{i,j}$, $F_{i+1,j}$, $F_{i,j+1}$, and $F_{i+1,j+1}$. If any of these 4 samples is invalid, then there is not a value for that surface to pass through, so the cubic convolution approach will be exited and control will instead pass to one of the (parallel or branch-based) bilinear interpolation methods to process. Thus, a Boolean variable (e.g., doCubic) is calculated that is the logical and-ing of the validity of these four samples:

doCubic=$V_{i,j} \wedge V_{i+1,j} \wedge V_{i,j+1} \wedge V_{i+1,j+1}$, and, if it is true, then the cubic convolution method can be used; otherwise the bilinear interpolation is performed.

Keys, Robert. "Cubic convolution interpolation for digital image processing." *Acoustics, Speech and Signal Processing, IEEE Transactions on* 29.6 (1981): 1153-1160 (hereinafter Keys), includes an analysis of the cubic convolution kernel and how to handle the edges of the input data. Keys proves that the interpolation yields the best results when the parameter a=−½, with a cubic approximation to the Taylor series expansion of the input data. The rest of the analysis in Keys uses this value, as does the rest of this discussion.

Keys analyzes the edge samples in detail. If the (x, y) interpolation coordinates fall in the first or last row or column, then the i−1, j−1, i+2, or j+2 samples are not part of the data set and are undefined. A common solution is to use the value of the adjacent row/column of samples, but as Keys shows that will result in a linear approximation to the input signal, not the expected cubic approximation. Keys derives a collection of equations (using implicit (i,j) notation) for these invalid samples that will maintain the cubic approximation:

$$F_{-1,k} = 3F_{0,k} - 3F_{1,k} + F_{2,k} \forall k \in \{-1,0,1,2\}$$

$$F_{k,-1} = 3F_{k,0} - 3F_{k,1} + F_{k,2} \forall k \in \{-1,0,1,2\}$$

$$F_{2,k} = 3F_{1,k} - 3F_{0,k} + F_{-1,k} \forall k \in \{-1,0,1,2\}$$

$$F_{k,2} = 3F_{k,1} - 3F_{k,0} + F_{k,-1} \forall k \in \{-1,0,1,2\}$$

Using these equations, there are 2 different but functionally equivalent approaches to evaluate the corner samples if needed. In the first approach, $F_{-1,-1}$ is evaluated using the horizontal direction first:

$$F_{-1,0} = 3F_{0,0} - 3F_{1,0} + F_{2,0}$$

$$F_{-1,1} = 3F_{0,1} - 3F_{1,1} + F_{2,1}$$

$$F_{-1,2} = 3F_{0,2} - 3F_{1,2} + F_{2,2}$$

$$F_{-1,-1} = 3F_{-1,0} - 3F_{-1,1} + F_{-1,2}$$

$$F_{-1,-1} = 3(3F_{0,0} - 3F_{1,0} + F_{2,0}) - 3(3F_{0,1} - 3F_{1,1} + F_{2,1}) + (3F_{0,2} - 3F_{1,2} + F_{2,2})$$

$$F_{-1,-1} = 9F_{0,0} - 9F_{1,0} + 3F_{2,0} - 9F_{0,1} + 9F_{1,1} - 3F_{2,1} + 3F_{0,2} - 3F_{1,2} + F_{2,2}$$

In the second approach, $F_{-1,-1}$ is evaluated using the vertical direction first:

$$F_{0,-1} = 3F_{0,0} - 3F_{0,1} + F_{0,2}$$

$$F_{1,-1} = 3F_{1,0} - 3F_{1,1} + F_{1,2}$$

$$F_{2,-1} = 3F_{2,0} - 3F_{2,1} + F_{2,2}$$

$$F_{-1,-1} = 3(3F_{0,0} - 3F_{0,1} + F_{0,2}) - 3(3F_{1,0} - 3F_{1,1} + F_{1,2}) + (3F_{2,0} - 3F_{2,1} + F_{2,2})$$

$$F_{-1,-1} = 9F_{0,0} - 9F_{0,1} + 3F_{0,2} - 9F_{1,0} + 9F_{1,1} - 3F_{1,2} + 3F_{2,0} - 3F_{2,1} + F_{2,2}$$

The order of the terms is different, but the same result is achieved. The equations from the first and second approaches are also invariant to a transpose of the input data.

While the above equations were developed to handle off the edge samples, they can equally be applied to any invalid sample. Each row and column of samples can be used with those equations to generate new values for the invalid samples.

There is one case that is not yet covered, however, which is when the samples at both ends of a row or column are invalid. The above equations for one end sample use the other end sample, so they are not applicable. To address this, the normal cubic convolution output is analyzed when the four values are collinear. In this case, the spacing between the values (for the four values in any row or column) is uniform:

$$F_0 - F_{-1} = F_1 - F_0 = F_2 - F_1,$$

where the single subscript indicates the row or column having the four collinear values.

This can be used to derive expressions for $F_{-1}$ and $F_2$ from $F_0$ and $F_1$:

$$F_{-1} = 2F_0 - F_1$$

$$F_2 = 2F_1 - F_0$$

Those values can be substituted into the full equation for cubic convolution as follows:

$$F_{-1}(a \cdot dx^3 - 2a \cdot dx^2 + a \cdot dx) + F_0((a+2)dx^3 - (a+3)dx^2 + 1) + F_1(-(a+2)dx^3 + (2a+3)dx^2 - a \cdot dx) + F_2(-a \cdot dx^3 + a \cdot dx^2)(2F_0 - F_1)(a \cdot dx^3 - 2a \cdot dx^2 + a \cdot dx) + F_0((a+2)dx^3 - (a+3)dx^2 + 1) + F_1(-(a+2)dx^3 + (2a+3)dx^2 - a \cdot dx) + ((2F_1 - F_0))(-a \cdot dx^3 + a \cdot dx^2)F_0((4a+2)dx^3 - (6a+3)dx^2 + 2a \cdot dx + 1) + F_1(-(4a+2)dx^3 + (6a+3)dx^2 - 2a \cdot dx)$$

When the value a=−½ is used, the higher order terms disappear:

$$F_0(1-dx) + F_1 dx$$

This reduces to the linear interpolation between $F_0$ and $F_1$. So the expressions above for $F_{-1}$ and $F_2$ can be used to replace the invalid samples at both ends of the row or column.

The high level procedure for replacing the invalid samples is: (1) evaluate and update end samples for rows 0 and 1 and columns 0 and 1, (2) evaluate and update corner samples (using updated values for middle edge samples), and (3) use 16 updated values in standard cubic convolution equations.

Cubic Convolution Mode—Branch-Based Version

Figure 12A:
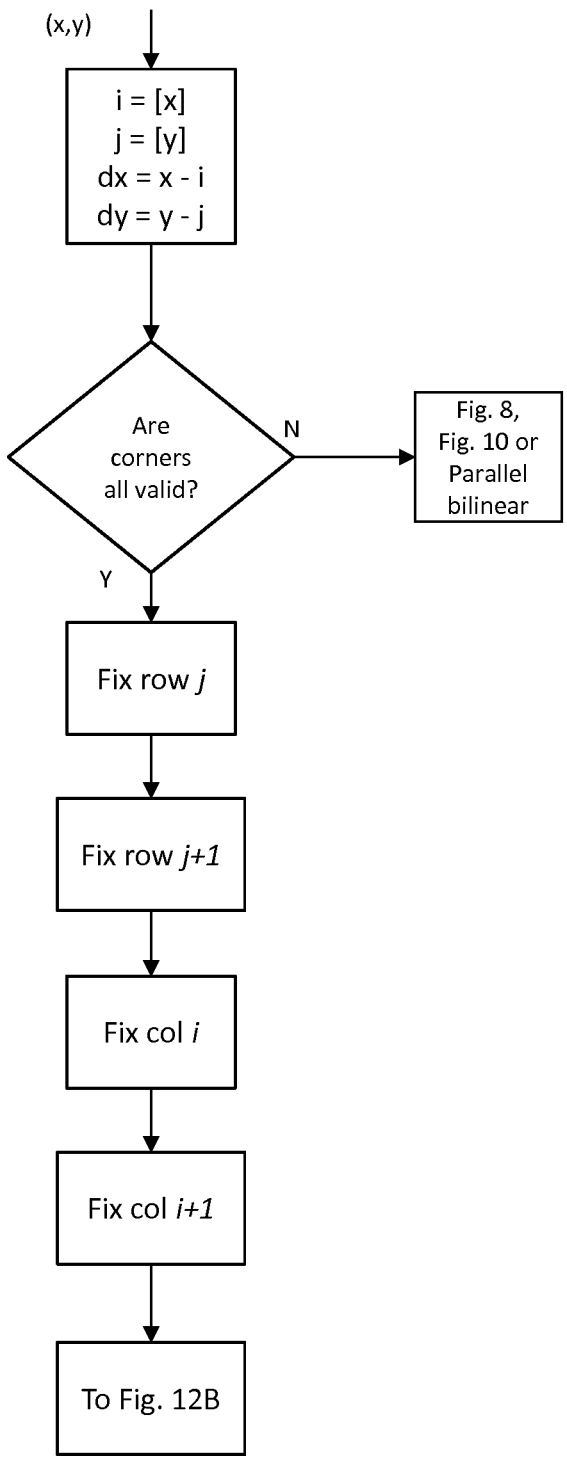
FIGS. 12A-12C are a flowchart showing a branch-based cubic convolution resampling technique.

As shown in FIG. 12A, having verified that the four central samples are valid, any of the other invalid sample values can be recalculated. First the middle two columns (j and j+1) and rows (i and i+1) are checked to see if either or both of their end samples are invalid. If only one is invalid, then an expression developed by Keys that uses the other three valid values is used to recalculate the single bad sample value. If both are invalid, then linear extrapolation is used to calculate both sample values. While FIG. 12A shows that values are fixed by fixing row j, then row j+1, col i and finally col i+1, those rows and columns can be fixed in any order.

The process for fixing row j is a two-level branching technique that determines if $V_{i-1,j}$ is one or zero and then determines whether $V_{i+2,j}$ is one or zero. Based on the results of the comparisons, various values in row j are updated as follows:

| $V_{i-1,j}$ | $V_{i+2,j}$ | Adjustments |
| --- | --- | --- |
| 0 | 0 | $F_{i-1,j} = 2F_{i,j} - F_{i+1,j}$ |
|   |   | $F_{i+2,j} = 2F_{i+1,j} - F_{i,j}$ |
| 0 | 1 | $F_{i-1,j} = 3F_{i,j} - F_{i+1,j} + F_{i+2,j}$ |
| 1 | 0 | $F_{i+2,j} = 3F_{i+1,j} - 3F_{i,j} + F_{i-1,j}$ |
| 1 | 1 | None |

Similarly, the process for fixing row j+1 is a two-level branching technique that determines if $V_{i-1,j+1}$ is one or zero and then determines whether $V_{i+2,j+1}$ is one or zero. Based on the results of the comparisons, various values in row j+1 are updated as follows:

| $V_{i-1,j+1}$ | $V_{i+2,j+1}$ | Adjustments |
| --- | --- | --- |
| 0 | 0 | $F_{i-1,j+1} = 2F_{i,j+1} - F_{i+1,j+1}$ |
|   |   | $F_{i+2,j+1} = 2F_{i+1,j+1} - F_{i,j+1}$ |
| 0 | 1 | $F_{i-1,j+1} = 3F_{i,j+1} - F_{i+1,j+1} + F_{i+2,j+1}$ |
| 1 | 0 | $F_{i+2,j+1} = 3F_{i+1,j+1} - 3F_{i,j+1} + F_{i-1,j+1}$ |
| 1 | 1 | None |

Alternatively, the fixing of rows j and j+1 could be performed by a single subroutine that receives j the first time and j+1 the second time. For example, a function, $$\text{fixRow}(F, V1, V2, i, j)$$

which receives the array of values F, the two validity bits (V1 and V2) and the two indices, would be called with fixRow(F, $V_{i-1,j}$, $V_{i+2,j}$, i, j) the first time and fixRow(F, $V_{i-1,j+1}$, $V_{i+2,j+1}$, i, j+1) the second time.

Columns i and i+1 are then examined to see if they need to be fixed as well. The process for fixing column i is a two-level branching technique that determines if $V_{i,j-1}$ is one or zero and then determines whether $V_{i,j+2}$ is one or zero. Based on the results of the comparisons, various values in row j are updated as follows:

| $V_{i,j-1}$ | $V_{i,j+2}$ | Adjustments |
|---|---|---|
| 0 | 0 | $F_{i,j-1} = 2F_{i,j} - F_{i,j+1}$ |
|   |   | $F_{i,j+2} = 2F_{i,j+1} - F_{i,j}$ |
| 0 | 1 | $F_{i,j-1} = 3F_{i,j} - F_{i,j+1} + F_{i,j+2(check)}$ |
| 1 | 0 | $F_{i,j+2} = 3F_{i,j+1} - 3F_{i,j} + F_{i,j-1}$ |
| 1 | 1 | None |

Similarly, the process for fixing column i+1 is a two-level branching technique that determines if $V_{i+1,j-1}$ is one or zero and then determines whether $V_{i+1,j+2}$ is one or zero. Based on the results of the comparisons, various values in column i+1 are updated as follows:

| $V_{i+1,j-1}$ | $V_{i+1,j+2}$ | Adjustments |
|---|---|---|
| 0 | 0 | $F_{i+1,j-1} = 2F_{i+1,j} - F_{i+1,j+1}$ |
|   |   | $F_{i+1,j+2} = 2F_{i+1,j+1} - F_{i+1,j}$ |
| 0 | 1 | $F_{i+1,j-1} = 3F_{i+1,j} - F_{i+1,j+1} + F_{i+1,j+2(check)}$ |
| 1 | 0 | $F_{i+1,j+2} = 3F_{i+1,j+1} - 3F_{i+1,j} + F_{i+1,j-1}$ |
| 1 | 1 | None |

As with the function fixRow( ) above, the fixing of columns i and i+1 could likewise be performed with a single subroutine (e.g., fixColumn( )) taking different parameters to fix the two different rows.

Figure 12B:
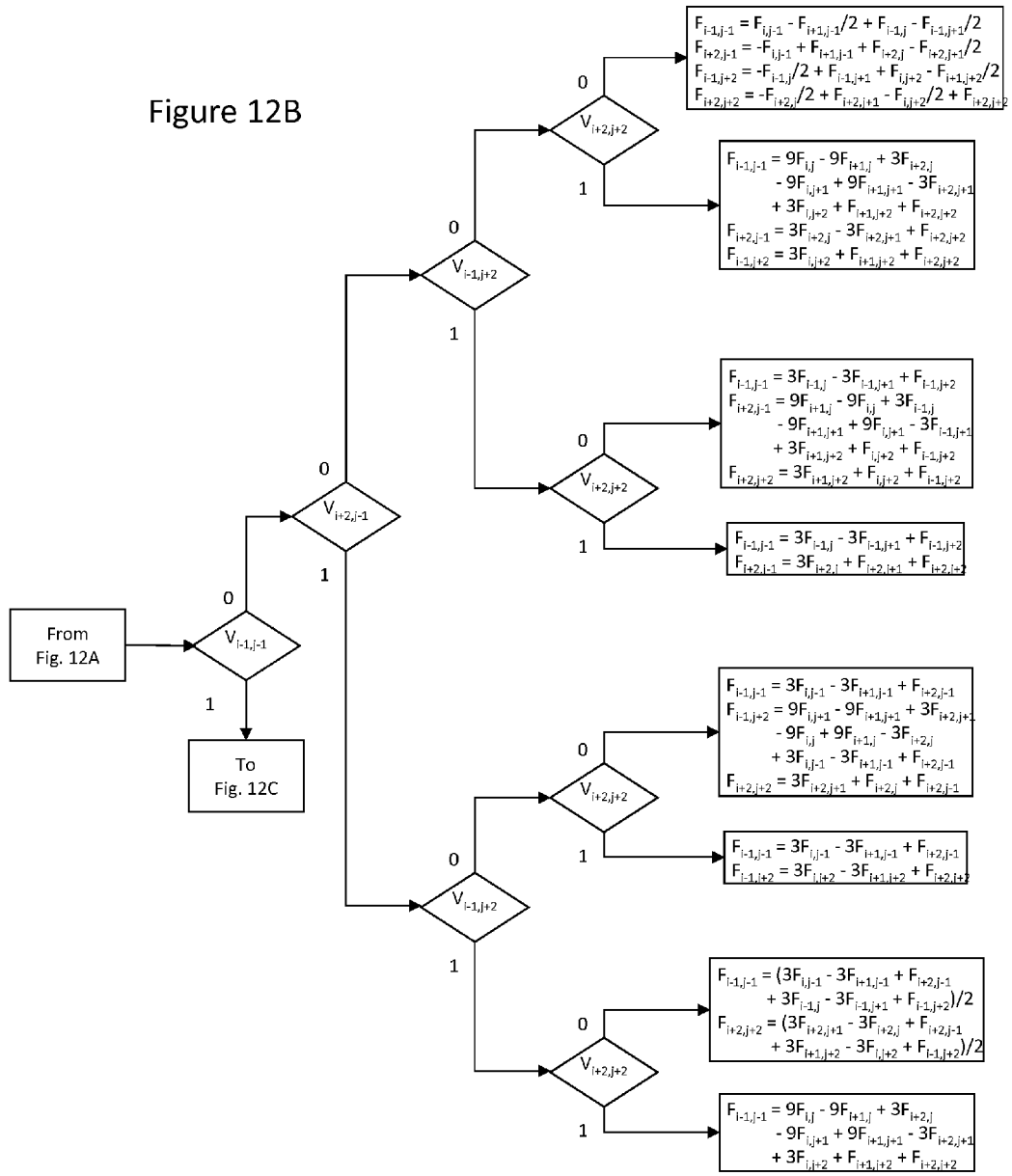
Figure 12C:
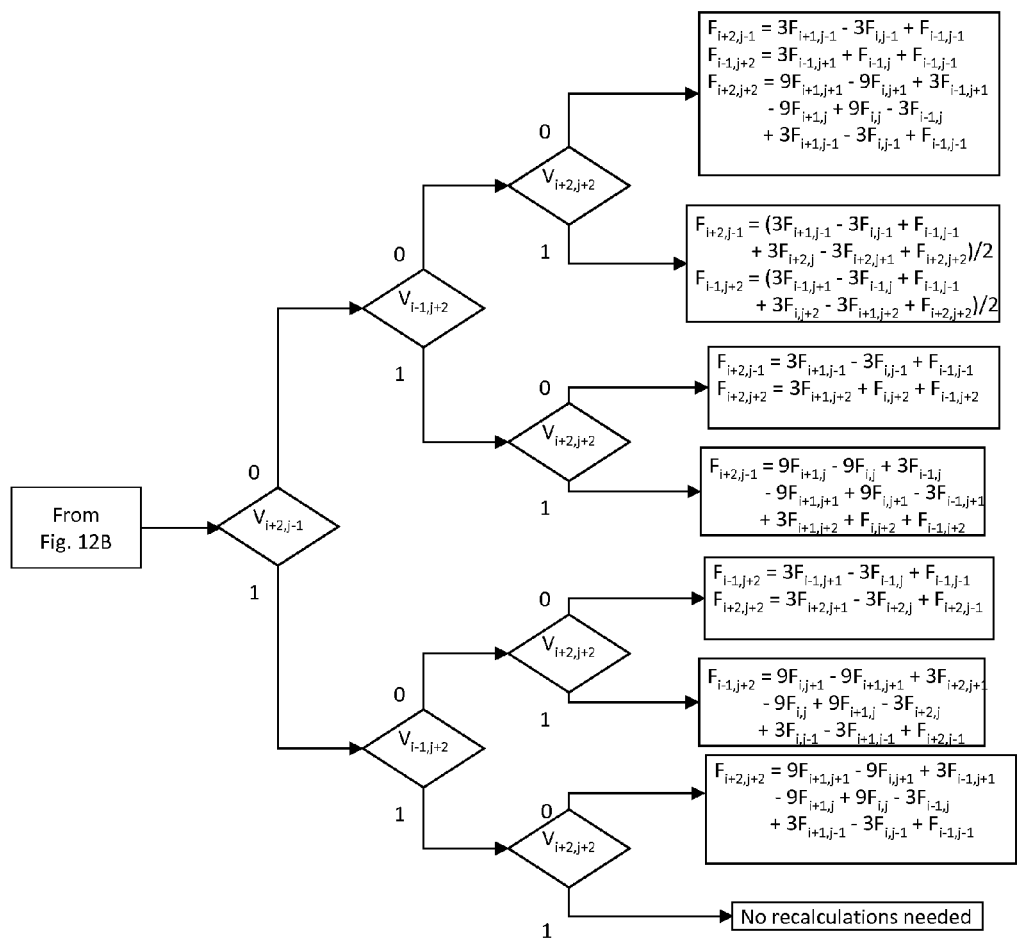
Figure 14A:
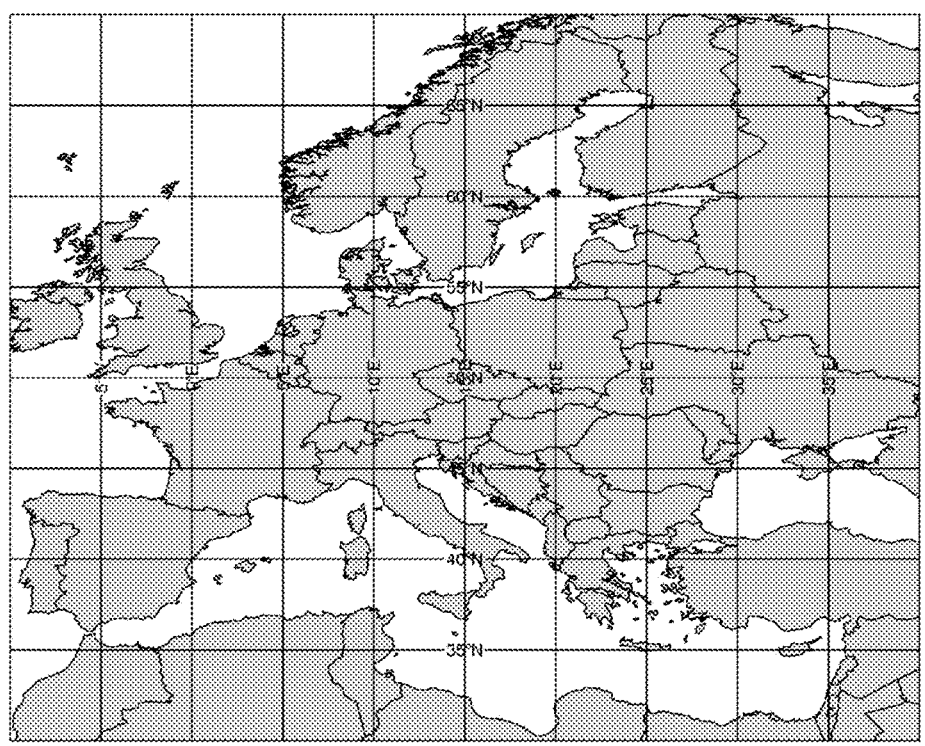
FIGS. 14A and 14B are maps of similar portions of Europe but shown in different projections (i.e., a geographic latitude/longitude projection and a Lambert Conformal Conic (LCC) projection, respectively).
Figure 14B:
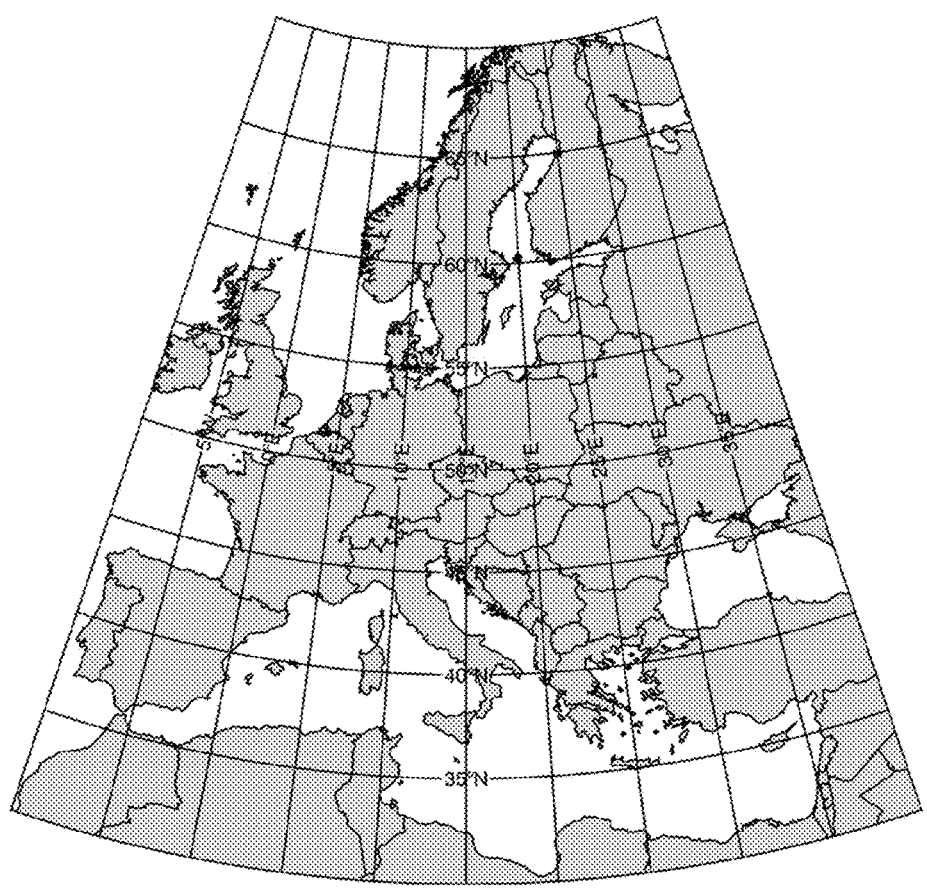

As shown in FIGS. 12B and 12C, the four corner samples are then examined as a group using a four-level branch-based method. If all four corner samples are valid (as shown in FIG. 12C in the bottom-most entry of the tree), then no recalculations/adjustments need to be done. If one corner sample is invalid, then a transpose-invariant expression using the 9 samples not in the same row or column of the invalid sample is used. If two corners are invalid, then it depends if they are in the same row or column or not. If they are in the same row or column, then they can be recalculated using the other three values in the column or row. If they are in opposite corners, then the row and column equations from Keys can be used to average them to maintain transpose invariance. If three of the corners are invalid, then the two that are in the same row or column as the valid sample use Keys' expression, while the opposite corner uses the expression involving the 9 valid samples not in the same row or column as it. Lastly, if all four corners are invalid, then linear extrapolation can be performed in both directions and those values averaged to maintain transpose invariance.

Once the invalid samples have been recalculated, the normal cubic convolution calculations can be used, using separation of variables to first resample the rows, and then the resulting column (or first the columns and then the row).

As would be appreciated by one of ordinary skill in the art, not only can the order of fixing the rows and columns be interchanged without departing from the scope of the branch-based version, but the order of testing the validity bits can also be changed.

Cubic Convolution Mode—Parallel Version

The first step in replacing the invalid samples is to look at the middle two rows and columns. A validity bitmask can be calculated from the first and last samples in each row/column:

$$\text{rowMask}_j = (V_{2,j} \ll 1) \vee V_{-1,j} \forall j \in \{0,1\}$$

$$\text{colMask}_i = (V_{i,2} \ll 1) \vee V_{i,-1} \forall i \in \{0,1\}$$

Those masks are used to index into a 4-element table of 4×4 matrices. The first element (i.e., the matrix accessed using an index of 00 (binary) or 0 (decimal)) is based on the linear extrapolation of both invalid samples, the next two matrices (indexed by binary values 01 and 10, respectively) are to replace either the first or last invalid sample, and the last element (i.e., the last matrix indexed by binary value 11) is the identity matrix since all the samples are valid. The table of matrices (TOM) is:

$$TOM = \left\{ \begin{bmatrix} 0 & 2 & -1 & 0 \\ 0 & 1 & 0 & 0 \\ 0 & 0 & 1 & 0 \\ 0 & -1 & 2 & 0 \end{bmatrix}, \begin{bmatrix} 1 & 0 & 0 & 0 \\ 0 & 1 & 0 & 0 \\ 0 & 0 & 1 & 0 \\ 1 & -3 & 3 & 0 \end{bmatrix}, \begin{bmatrix} 0 & 3 & -3 & 1 \\ 0 & 1 & 0 & 0 \\ 0 & 0 & 1 & 0 \\ 0 & 0 & 0 & 1 \end{bmatrix}, \begin{bmatrix} 1 & 0 & 0 & 0 \\ 0 & 1 & 0 & 0 \\ 0 & 0 & 1 & 0 \\ 0 & 0 & 0 & 1 \end{bmatrix} \right\}$$

Those matrices are used to calculate new values for $F_{-1,0}$, $F_{2,0}$, $F_{-1,1}$, $F_{2,1}$, $F_{0,-1}$, $F_{0,2}$, $F_{1,-1}$, and $F_{1,2}$, as needed using:

$$\begin{bmatrix} F'_{-1,j} \\ F'_{i,j} \\ F'_{i+1,j} \\ F'_{i+2,j} \end{bmatrix} = [TOM[(V_{i+2,j} \ll 1) \vee V_{i-1,j}]] \begin{bmatrix} F_{-1,j} \\ F_{i,j} \\ F_{i+1,j} \\ F_{i+2,j} \end{bmatrix},$$

So, for example, when $V_{i-1,j}$ and $V_{i+2,j}$ are both zero, the index is 0 and:

$$\begin{bmatrix} F'_{-1,j} \\ F'_{i,j} \\ F'_{i+1,j} \\ F'_{i+2,j} \end{bmatrix} = \begin{bmatrix} 0 & 2 & -1 & 0 \\ 0 & 1 & 0 & 0 \\ 0 & 0 & 1 & 0 \\ 0 & -1 & 2 & 0 \end{bmatrix} \begin{bmatrix} F_{-1,j} \\ F_{i,j} \\ F_{i+1,j} \\ F_{i+2,j} \end{bmatrix}$$

This results in $F_{i-1,j} = 2F_{i,j} - F_{i+1,j}$ and $F_{i+2,j} = 2F_{i+1,j} - F_{i,j}$. Similarly, when $V_{i-1,j}$ and $V_{i+2,j}$ are both one, the index is 3, multiplication by the identity matrix causes:

$$\begin{bmatrix} F'_{-1,j} \\ F'_{i,j} \\ F'_{i+1,j} \\ F'_{i+2,j} \end{bmatrix} = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \begin{bmatrix} F_{-1,j} \\ F_{i,j} \\ F_{i+1,j} \\ F_{i+2,j} \end{bmatrix} = \begin{bmatrix} F_{-1,j} \\ F_{i,j} \\ F_{i+1,j} \\ F_{i+2,j} \end{bmatrix}$$

There are 16 permutations of corner validity, which have some symmetries and fall into 7 categories as described in greater detail below.

Category A—4 Valid Corner Samples

This is the simplest case, and since there are no invalid samples, there is nothing to recalculate.

Category B—1 Valid Corner Sample

This case is already discussed in Keys, when it describes how to handle edges of the data set. As discussed above, either the horizontal or vertical expression for the corner opposite the valid one can be used with the same result. The 9 parameter expression is used for the sample opposite the valid one, and then the standard 3 parameter expressions are used for the other two invalid corners.

Category C—1 Invalid Corner Sample

Category C is essentially a subset of Category B. While the 3 term row or column expression on the adjacent edges could be used, the two expressions are not guaranteed to get the same value. So instead the 9 term expression that is invariant to the data set transpose is used, and it always gives the same value.

Category D—2 Invalid Corner Samples in Same Row

This case is detailed in Keys for edge samples. So the appropriate 3 term expression for the two corners is used, using the other samples in those columns.

Category E—2 Invalid Corner Samples in Same Column

This is essentially the transpose of Case D, so the corresponding 3 term expressions from the Keys paper can be used, using the other samples in the respective rows.

Category F—2 Invalid Corner Samples in Opposite Corners

While the 3 term expressions of the other samples in the same row or column could be used, that would break the transpose invariance. Instead, both the row and column expressions are evaluated, and then the results are averaged. This breaks the cubic approximation to the Taylor series, but with the advantage of retaining the transpose invariance.

Category G—4 Invalid Corner Samples

Category G is related to Case F, but the 3 term expressions cannot be used since they would each involve invalid corner sample values. So instead linear extrapolation is used as it was above when both middle edge samples in the same row/column were invalid. But as in Case F, the corners cannot be calculated just row-wise or column-wise, since that would break the transpose invariance. So again the average of both the row and column extrapolations is used.

It can be shown that in the extreme case of this category, when all 12 outer samples are invalid, the equations reduce to the standard bilinear interpolation of the 4 center samples. First, the middle edge samples are calculated using the linear extrapolation equations:

$$F_{-1,0} = 2F_{0,0} - F_{1,0}$$

$$F_{-1,1} = 2F_{0,1} - F_{1,1}$$

$$F_{2,0} = 2F_{1,0} - F_{0,0}$$

$$F_{2,1} = 2F_{1,1} - F_{0,1}$$

$$F_{0,-1} = 2F_{0,0} - F_{0,1}$$

$$F_{1,-1} = 2F_{1,0} - F_{1,1}$$

$$F_{0,2} = 2F_{0,1} - F_{0,0}$$

$$F_{1,2} = 2F_{1,1} - F_{1,0}$$

Next the upper left corner is evaluated, noticing that the linear extrapolation yields the same result in both dimensions:

$$F_{-1,-1} = \frac{2F_{0,-1} - F_{1,-1}}{2} + \frac{2F_{-1,0} - F_{-1,1}}{2}$$

$$F_{-1,-1} = \frac{2(2F_{0,0} - F_{0,1}) - (2F_{1,0} - F_{1,1})}{2} + \frac{2(2F_{0,0} - F_{1,0}) - (2F_{0,1} - F_{1,1})}{2}$$

$$F_{-1,-1} = \frac{4F_{0,0} - 2F_{0,1} - 2F_{1,0} + F_{1,1}}{2} + \frac{4F_{0,0} - 2F_{1,0} - 2F_{0,1} + F_{1,1}}{2}$$

$$F_{-1,-1} = 4F_{0,0} - 2F_{0,1} - 2F_{1,0} + F_{1,1}$$

The two extrapolations yield the same expression, so their average is equal to the extrapolation in either direction. The same pattern applies to all 4 corners. As shown above, this linear extrapolation in the 1-D case reduces to linear interpolation, so it can be shown that this holds for all four rows, and that they result in a column that matches the linear extrapolation of the two center rows, so the final interpolated result is the same as bilinear interpolation of the inner four samples.

To avoid branching, lookup tables are again used in the parallel implementation. There are 16 different permutations of corner validity, so the table has 16 elements in the first dimension. For each of the 16 permutations, radically different expressions can exist for each corner, using anywhere from 1 to 9 other samples to calculate its value. For each permutation, a 4×16 matrix can be used that can be multiplied by a 16-element vector comprised of all the samples, and the result of this multiplication is a 4-element vector containing the adjusted corner values. The 16-element vector can be stored in either a row-major or column-major format. The resulting lookup table has 1024 elements in it, but the vast majority of the values are 0's, with occasional matrix elements taking on the values 0.5, 1, 1.5, 2, and 3.

The ordering of the sample values in the column vectors to build the table are given by:

$$\begin{bmatrix} F'_{-1,-1} \\ F'_{2,-1} \\ F'_{-1,2} \\ F'_{2,2} \end{bmatrix} = [4 \times 16] \begin{bmatrix} F_{-1,-1} \\ F_{0,-1} \\ F_{1,-1} \\ F_{2,-1} \\ F_{-1,0} \\ F_{0,0} \\ F_{1,0} \\ F_{2,0} \\ F_{-1,1} \\ F_{0,1} \\ F_{1,1} \\ F_{2,1} \\ F_{-1,2} \\ F_{0,2} \\ F_{1,2} \\ F_{2,2} \end{bmatrix}$$

Using this row major ordering of the input and output samples produces the 16×4×16 lookup table of FIGS. 13A and 13B (referred to herein as LUT13AB) that can be indexed by the value of the bitmask. The result of the

[4×16][16×1] matrix multiplication is 4 values that can replace their original values, and the resulting 16 (original or recalculated) values can be passed into the standard cubic convolution equations, evaluating each row of samples first, then the column of resulting values. In fact, the matrices of FIGS. 13A and 13B are equivalent to the recalculations shown in FIGS. 12B and 12C and ordered from the top of FIG. 12B to the bottom of FIG. 12C (such that FIGS. 12B and 12C correspond to bitmasks 0-15 sequentially).

In an embodiment where values can be not a number (NAN) or infinity, the same technique as described above with respect to the bilinear interpolation can be used to remove those special values before applying any of the matrices.

In an exemplary embodiment, a lookup table called FiniteLUT is created in the form of a 2×16 array as follows:

$$FiniteLUT = \begin{bmatrix} 0 & F_{-1,-1} \\ 0 & F_{0,-1} \\ 0 & F_{1,-1} \\ 0 & F_{2,-1} \\ 0 & F_{-1,0} \\ 0 & F_{0,0} \\ 0 & F_{1,0} \\ 0 & F_{2,0} \\ 0 & F_{-1,1} \\ 0 & F_{0,1} \\ 0 & F_{1,1} \\ 0 & F_{2,1} \\ 0 & F_{-1,2} \\ 0 & F_{0,2} \\ 0 & F_{1,2} \\ 0 & F_{2,2} \end{bmatrix}$$

An array (e.g., isFinite) then can be set to be the result of the comparisons of the sample values with themselves, as follows:

$$isFinite = \begin{bmatrix} 0*F_{-1,-1} == 0 \\ 0*F_{0,-1} == 0 \\ 0*F_{1,-1} == 0 \\ 0*F_{2,-1} == 0 \\ 0*F_{-1,0} == 0 \\ 0*F_{0,0} == 0 \\ 0*F_{1,0} == 0 \\ 0*F_{2,0} == 0 \\ 0*F_{-1,1} == 0 \\ 0*F_{0,1} == 0 \\ 0*F_{1,1} == 0 \\ 0*F_{2,1} == 0 \\ 0*F_{-1,2} == 0 \\ 0*F_{0,2} == 0 \\ 0*F_{1,2} == 0 \\ 0*F_{2,2} == 0 \end{bmatrix},$$

and an array of modified F values (e.g., mFV) can be created such that:

$$mFV = \begin{bmatrix} FiniteLUT[isFinite[0]][0] \\ FiniteLUT[isFinite[1]][1] \\ FiniteLUT[isFinite[2]][2] \\ FiniteLUT[isFinite[3]][3] \\ FiniteLUT[isFinite[4]][4] \\ FiniteLUT[isFinite[5]][5] \\ FiniteLUT[isFinite[6]][6] \\ FiniteLUT[isFinite[7]][7] \\ FiniteLUT[isFinite[8]][8] \\ FiniteLUT[isFinite[9]][9] \\ FiniteLUT[isFinite[10]][10] \\ FiniteLUT[isFinite[11]][11] \\ FiniteLUT[isFinite[12]][12] \\ FiniteLUT[isFinite[13]][13] \\ FiniteLUT[isFinite[14]][14] \\ FiniteLUT[isFinite[15]][15] \end{bmatrix}$$

Thus, in matrix form, the adjusted values are calculated as:

$$\begin{bmatrix} F'_{-1,-1} \\ F'_{2,-1} \\ F'_{-1,2} \\ F'_{2,2} \end{bmatrix} = [LUT13AB[bm]] \begin{bmatrix} FiniteLUT[isFinite[0]][0] \\ FiniteLUT[isFinite[1]][1] \\ FiniteLUT[isFinite[2]][2] \\ FiniteLUT[isFinite[3]][3] \\ FiniteLUT[isFinite[4]][4] \\ FiniteLUT[isFinite[5]][5] \\ FiniteLUT[isFinite[6]][6] \\ FiniteLUT[isFinite[7]][7] \\ FiniteLUT[isFinite[8]][8] \\ FiniteLUT[isFinite[9]][9] \\ FiniteLUT[isFinite[10]][10] \\ FiniteLUT[isFinite[11]][11] \\ FiniteLUT[isFinite[12]][12] \\ FiniteLUT[isFinite[13]][13] \\ FiniteLUT[isFinite[14]][14] \\ FiniteLUT[isFinite[15]][15] \end{bmatrix}$$

where "bm" is the bitmask value and LUT13AB is the lookup table of FIGS. 13A and 13B created from the 16-element array of 4×16 matrices, significantly reducing branching.

Cubic Convolution Mode—Function Table-Based Version

Rather than utilize individual branches for the various conditions or the parallel version, it is instead possible to use a function table that contains pointers to the code to be run based on the conditions for a pixel being resampled, thereby selecting the appropriate code in a single branch per pixel. Having calculated the bitmask as described above, a function lookup table can be used to jump to the code to calculate the appropriate one of the 16 different cases of either FIG. 12B or FIG. 12C, once per pixel.

The above processing for each of the different modes is preferably performed on or under the control of a computer processor-based computer (e.g., using a RISC or CISC integrated circuit processor) storing computer instructions in a non-transitory digital memory accessible to the processor, wherein the computer instructions control the processor to perform various portions of the data resampling techniques described herein and variations thereon. The processor may include more than one processing element (e.g., core) therein, and the various instructions may be performed in parallel as much as possible, either within the same processing element or across multiple processing elements. By utilizing the parallel implementations and the function table based implementations discussed above, branching can be reduced and greater efficiency can be achieved. The methods described herein are not limited to a single computer language (e.g., C versus C++ versus Matlab versus Python), but instead any computer language that is capable of performing portions of matrix multiplication in parallel is usable for parallel versions, any language capable of performing branch-based calculations is usable for the branch-based versions, and any computer language that is capable of utilizing function-tables is usable for the function table-based versions. In one embodiment, a single-instruction, multiple data processor and/or a multiple instruction, multiple data processor is utilized to allow greater parallelism in the calculation of mathematical matrix operations. In addition to the integrated circuit(s) for the processor(s) and memory, other integrated circuits (e.g., one or more co-processors or application specific integrated circuits (ASICs)) may be used to perform portions of the calculations described herein, such as matrix multiplication. The co-processors and/or ASICs may be circuits with fixed logic configurations or with dynamically reconfigurable logic configurations (e.g., FPGAs, or GALs).

In one embodiment, the resampling of all data points are performed on the same processor. In an alternate embodiment, using a distributed processing platform, the resampling of data points is divided into a number of separately processed portions (e.g., strips) which are divided among a number of processing elements, either on a single machine or across multiple machines (e.g., utilizing a communications network and/or a shared bus). One such distributed processing platform is the INTEL Thread Building Blocks system which enables parallel C++ programs to run across multiple cores such that blocks of resampling calculations can be distributed to be processed in parallel.

While the above discussion has generally been directed to data resampling in the context of image data, the techniques described herein are not limited to processing image data. The processing of other regular gridded data (e.g., temperature data, relative humidity data and/or wind velocity data) is also within the scope of the present teachings.

While certain configurations of structures have been illustrated for the purposes of presenting the basic structures of the present invention, one of ordinary skill in the art will appreciate that other variations are possible which would still fall within the scope of the appended claims.

The invention claimed is:

1. An integrated circuit-implemented method of performing data resampling, comprising:
controlling a processor to read executable computer instructions from a non-transitory computer memory, the executable computer instructions for controlling at least one integrated circuit to perform the steps of:
reading data to be resampled from a computer memory; and
for data items in the data to be resampled, performing the steps of:
selecting a data item at location (x,y);
assigning a value of i to floor(x);
assigning a value of j to floor(y);
determining dx such that dx=x−i;
determining dy such that dy=y−j;
determining validities of at least four points surrounding location (x,y); and
calculating a resampled value for the data item at location (x,y) using i, j, dx, dy and valid points of the at least four points surrounding location (x,y).

2. The method as claimed in claim 1, wherein calculating the resampled value comprises calculating the resampled value using a nearest neighbor mode of data resampling.

3. The method as claimed in claim 1, wherein calculating the resampled value comprises calculating the resampled value using a bilinear mode of data resampling.

4. The method as claimed in claim 1, wherein calculating the resampled value comprises calculating the resampled value using a cubic convolution mode of data resampling.

5. The method as claimed in claim 1, wherein calculating the resampled value comprises calculating the resampled value using a branch-based nearest neighbor mode of data resampling.

6. The method as claimed in claim 1, wherein calculating the resampled value comprises calculating the resampled value using a branch-based bilinear mode of data resampling.

7. The method as claimed in claim 1, wherein calculating the resampled value comprises calculating the resampled value using a branch-based cubic convolution mode of data resampling.

8. The method as claimed in claim 1, wherein calculating the resampled value comprises calculating the resampled value using a matrix-based nearest neighbor mode of data resampling.

9. The method as claimed in claim 1, wherein calculating the resampled value comprises calculating the resampled value using a matrix-based bilinear mode of data resampling.

10. The method as claimed in claim 1, wherein calculating the resampled value comprises calculating the resampled value using a matrix-based cubic convolution mode of data resampling.

11. The method as claimed in claim 1, wherein calculating the resampled value comprises calculating the resampled value using a function table-based nearest neighbor mode of data resampling.

12. The method as claimed in claim 1, wherein calculating the resampled value comprises calculating the resampled value using a function table-based bilinear mode of data resampling.

13. The method as claimed in claim 1, wherein calculating the resampled value comprises calculating the resampled value using a function table-based cubic convolution mode of data resampling.

14. The method as claimed in claim 1, wherein the data comprises at least one of image data, temperature data, relative humidity data, and wind velocity data.

15. The method as claimed in claim 1, wherein the at least one integrated circuit comprises the processor.

16. The method as claimed in claim 1, wherein the at least one integrated circuit consists of the processor.

17. An image processing system for performing data resampling, comprising:
a non-transitory computer memory for storing executable computer instructions;
at least one integrated circuit configured to read executable computer instructions from the non-transitory computer memory, the executable computer instructions for controlling the at least one integrated circuit to perform the steps of:

reading data to be resampled from a computer memory; and for data items in the data to be resampled, performing the steps of:
    selecting a data item at location (x,y);
    assigning a value of i to floor(x);
    assigning a value of j to floor(y);
    determining dx such that dx=x−i;
    determining dy such that dy=y−j;
    determining validities of at least four points surrounding location (x,y); and
    calculating a resampled value for the data item at location (x,y) using i, j, dx, dy and valid points of the at least four points surrounding location (x,y).

18. The image processing system as claimed in claim 17, wherein the at least one integrated circuit comprises a processor.

19. The image processing system as claimed in claim 17, wherein the at least one integrated circuit consists of a processor.

20. The image processing system as claimed in claim 17, wherein calculating the resampled value comprises calculating the resampled value using a branch-based nearest neighbor mode of data resampling.

21. The image processing system as claimed in claim 17, wherein calculating the resampled value comprises calculating the resampled value using a branch-based bilinear mode of data resampling.

22. The image processing system as claimed in claim 17, wherein calculating the resampled value comprises calculating the resampled value using a branch-based cubic convolution mode of data resampling.

23. The image processing system as claimed in claim 17, wherein calculating the resampled value comprises calculating the resampled value using a matrix-based nearest neighbor mode of data resampling.

24. The image processing system as claimed in claim 17, wherein calculating the resampled value comprises calculating the resampled value using a matrix-based bilinear mode of data resampling.

25. The image processing system as claimed in claim 17, wherein calculating the resampled value comprises calculating the resampled value using a matrix-based cubic convolution mode of data resampling.

\* \* \* \* \*